(12) United States Patent
Brunner et al.

(10) Patent No.: US 10,343,367 B2
(45) Date of Patent: Jul. 9, 2019

(54) STRETCH-SLEEVE FILM

(71) Applicant: Dow Global Technologies LLC, Midland, MI (US)

(72) Inventors: Kurt Brunner, Zurich (CH); Hans Jörg Forster, Bischofszell (CH); Thomas Galatik, Richterswil (CH)

(73) Assignee: Dow Global Technologies LLC, Midland, MI (US)

( * ) Notice: Subject to any disclaimer, the term of this patent is extended or adjusted under 35 U.S.C. 154(b) by 933 days.

(21) Appl. No.: 14/781,624

(22) PCT Filed: Apr. 15, 2014

(86) PCT No.: PCT/US2014/034160
§ 371 (c)(1),
(2) Date: Oct. 1, 2015

(87) PCT Pub. No.: WO2014/172350
PCT Pub. Date: Oct. 23, 2014

(65) Prior Publication Data
US 2016/0059510 A1   Mar. 3, 2016

Related U.S. Application Data

(60) Provisional application No. 61/813,008, filed on Apr. 17, 2013.

(30) Foreign Application Priority Data

Apr. 15, 2013   (CH) ...................................... 0781/13

(51) Int. Cl.
*B32B 1/08* (2006.01)
*B32B 27/08* (2006.01)
(Continued)

(52) U.S. Cl.
CPC ................ *B32B 1/08* (2013.01); *B29C 63/18* (2013.01); *B32B 1/02* (2013.01); *B32B 27/08* (2013.01);
(Continued)

(58) Field of Classification Search
CPC ........... B32B 1/08; B32B 33/00; B32B 27/08; B32B 1/02; B32B 27/32; B32B 2439/00;
(Continued)

(56) References Cited

U.S. PATENT DOCUMENTS 3,986,611 A * 10/1976 Dreher ............... B65D 71/0096
206/497
5,891,537 A * 4/1999 Yoshii ................ B65D 23/0871
40/299.01

(Continued)

FOREIGN PATENT DOCUMENTS

EP   0 416 815 A2   3/1991
EP   0562496 B1   5/1997
(Continued)

OTHER PUBLICATIONS

Gedeon (Mike Gedeon, Technical Tidbits, "Elastic Modulus," Materion Brush Performance Alloys, 48, Dec. 2012, p. 1-2).*
(Continued)

*Primary Examiner* — Gerard Higgins
*Assistant Examiner* — Kevin C Ortman, Jr.

(57) ABSTRACT

The present invention concerns a film (1), which contains at least one inner layer (3, 4, 5) and two outer layers (2, 6) enclosing at least one inner layer (3, 4, 5) where the, at least one, inner layer (3, 4, 5) contains a polymer A in a quantity from 70 to 100 wt. %, preferably 80 to 99 wt. % and especially preferably from 90 to 99 wt. %, relative to the total weight of the inner layer (3, 4, 5), which is character-
(Continued)

ized by special interesting properties, where the outer layers (2, 6) contain a mixture of polymer A and a polymer B, where polymer B is selected from the group consisting of low-density polyethylenes, said film (1) having a thickness from 30 to 70 μm, preferably 35 to 60 μm and especially 40 to 55 and an elastic restoring capacity of more than 95% at an elongation of 55%. The present invention also concerns a process for the production of a film, the use of the wealth. As a stretch-sleeve up film and articles provided with the oil of the invention, such as packaging. The present disclosure is directed to a stretch-sleeve film and articles including the stretch-sleeve film. The stretch-sleeve film includes at least three layers including two skin layers and a core layer. The core layer includes at least 75 wt % of an ethylene/a-olefin copolymer (A) characterized by (i) a density from 0.890 g/cc to 0.920 g/cc; (ii) a Mw/Mn from 2.0 to 4.0; (iii) a ZSVR less than 6.0; and (iv) a CDC from 85 to 150. At least one skin layer includes a polymeric material selected from the ethylene/a-olefin copolymer (A), a low density polyethylene, a medium density polyethylene, and combinations thereof. The stretch-sleeve film has an elastic recovery at 55% stretch of at least 95%.

14 Claims, 3 Drawing Sheets

(51) Int. Cl.
  *B32B 27/32* (2006.01)
  *B32B 1/02* (2006.01)
  *B32B 33/00* (2006.01)
  *B29C 63/18* (2006.01)
  *B29C 55/24* (2006.01)
  *B29L 9/00* (2006.01)

(52) U.S. Cl.
  CPC .............. *B32B 27/32* (2013.01); *B32B 33/00* (2013.01); *B29C 55/24* (2013.01); *B29L 2009/00* (2013.01); *B32B 2270/00* (2013.01); *B32B 2307/54* (2013.01); *B32B 2307/72* (2013.01); *B32B 2323/046* (2013.01); *B32B 2439/00* (2013.01)

(58) Field of Classification Search
  CPC ............ B32B 2270/00; B32B 2307/54; B32B 2307/72; B32B 2323/046; B29C 63/18; B29C 55/24; B29L 2009/00
  USPC .... 428/516, 220, 476.9, 458, 461, 480, 212, 428/213, 218, 336, 339, 35.2, 141, 216, 428/219, 315.9, 349, 34.9, 35.7, 474.7, 428/475.2, 483, 517, 137, 195.1, 221, 428/313.9, 316.6, 317.9, 318.4, 318.6, 428/319.7, 319.9, 327, 32.5, 332, 334, 428/343, 34.8, 354, 355 N, 35.8, 36.6, 428/36.9, 36.91, 36.92, 394, 421, 423.7, 428/426, 446, 460, 500, 513, 523, 58; 526/64, 348.6, 170, 348, 348.5, 65, 124.9, 526/131, 145, 255, 281, 352, 352.2, 59, 526/61, 89; 264/210.1, 173.12, 175, 514, 264/555, 129, 142, 154, 176.1, 1.32, 1.6, 264/1.7, 210.7, 2.7, 322, 400, 40.1, 45.8, 264/45.9, 46.1, 48, 49, 510, 513, 515
  See application file for complete search history.

(56) References Cited

U.S. PATENT DOCUMENTS

| | | | |
|---|---|---|---|
| 8,627,870 B2 | 1/2014 | Leykamm | |
| 2009/0192270 A1* | 7/2009 | Malakoff | C08L 23/0815 525/240 |
| 2009/0269566 A1 | 10/2009 | Eichbauer et al. | |
| 2011/0003940 A1* | 1/2011 | Karjala | C08F 10/00 525/240 |

FOREIGN PATENT DOCUMENTS

| | | |
|---|---|---|
| EP | 2316738 A2 | 5/2011 |
| JP | 7234638 | 9/1995 |
| JP | 2001145985 A | 5/2001 |
| JP | 2001322648 A | 11/2001 |
| JP | 2001324932 A | 11/2001 |
| JP | 2002196678 A | 7/2002 |
| JP | 2002275323 A | 9/2002 |
| JP | 2004251970 A | 9/2004 |
| JP | 2006321082 A | 11/2006 |
| JP | 04597403 A2 | 12/2010 |
| WO | 2006037603 A1 | 4/2006 |
| WO | 2010047709 A1 | 4/2010 |
| WO | 2011159376 A1 | 12/2011 |
| WO | 2012001182 A1 | 1/2012 |

OTHER PUBLICATIONS

Williams and Ward, J. Polym. Sci., Polym. Letters, 6, 621 (1968).
B Monrabal et al, Macromol Symp.257, 71-79 (2007).
ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.
Macromolecules, vol. 38, 6988, 2005.
PCT/US2014/034160, International Search Report dated Oct. 23, 2014.
PCT/US2014/034160, International Preliminary Report on Patentability dated Oct. 20, 2015.
PCT/US2014/034160, Written Opinion dated Oct. 15, 2015.

* cited by examiner

STRETCH-SLEEVE FILM

The present invention concerns a stretch-sleeve film (or foils) and a process for its production and articles provided with stretch-sleeve films, especially packaging materials.

It is customary today to provide articles such as packaging material for products and foods with films of polymer material. Besides technical reasons, e.g., stealing of the contents of the package against environmental factors, this is also done for reasons of design or for reasons of applying information to the package contents and the packaging. For this reason, the films are first provided with the desired information and/or the desired design, preferably by printing. Following this, the film is applied to the packaging by conventional procedures.

In the case of bottles or similar packaging, the film is usually shaped into a tube-like object, folded over the outside of the package and subsequently brought into the required shape. In the case of the so-called shrink sleeve technology, a tube-shaped film is used, which displays a larger inner diameter than the article, e.g., the packaging on which it is to be applied. After the film is put on, it has to be shrunk to the desired diameter by supplying energy. In the case of the so-called stretch-sleeve technology, tube-shaped film material is used with a smaller inner diameter than the article, e.g., the packaging on which it is to be applied. For its application, the film has to be stretched using a stretching device. In the stretched state, the film is pulled over the article, such as packaging (e.g., a bottle). After removal of the mechanical stretching, the film fits tightly due to its inherent restorative force on the outer surface of the article, e.g., a package such as a bottle. A supply of energy is no longer necessary Stretch-sleeve films must satisfy various requirements. On the one hand, they must have good sealing strength, good optical appearance and optionally good barrier properties as well as printability. On the other hand, the films must be stretchable and capable of returning essentially to their original dimensions so that they can be applied to the articles in the manner described above. On the other hand, they must display adequate stiffness/rigidity.

For packaging material, in particular, with a demanding profile, e.g., an inhomogeneously shaped bottle with indentations of different diameters, possibly grooves etc. the films available on the market are still not optimal. In order to put a film on packaging material of such shape, the hose-like film material must be stretched to an inner diameter that is considerably, sometimes more than 50%, greater than the inner diameter that the film has to assume in the final state on the segments of the packaging with the smallest outer diameter. A film optimally satisfying this requirement profile for stretchability (tensile strength), elastic restorability and stiffness has long been unavailable.

The objective of the present invention is to prepare a stretch-sleeve film with improved properties.

According to the present invention, the problem above was additionally solved at least in part by a film, comprising at least one inner layer and two outer layers enclosing said at least one inner layer, where the, at least one, inner layer contains a polymer in a quantity from 70 to 100 wt. %, preferably 80 to 99 wt. % and especially preferably from 90 to 99 wt. % t, relative to the total weight of the inner layer, wherein said polymer is selected from the group consisting of a polymer A and a polymer C, wherein said polymer A, in the form of a film with 25 μm thickness, displays a tensile strength until break in the longitudinal direction of more than 30 mPa, preferably more than 40 mPa, a tensile elongation until break in the longitudinal direction of more than 300%, preferably more than 350% and especially preferably of more than 380% and a secant modulus in the longitudinal direction at 1% tension of more than 80 mPa, preferably more than a 85 mPa. Said polymer C is a vinylacetate polymer, preferably an ethylene vinylacetate copolymer. Further, where the outer layers contain a mixture of polymer A and polymer B, where polymer B is selected from the group consisting of low density polyethylenes, the film having a thickness of 30 to 70 μm, preferably 35 to 60 μm and especially 40 to 55 μm and an elastic restoration capacity of at least 80% at an elongation of 55%.

According to the present invention, the problem above was solved at least in part by a film, comprising at least one inner layer and two outer layers enclosing an inner layer, where the, at least one, inner layer contains a polymer A in a quantity from 70 to 100 wt. % relative to the total weight of the inner layer, preferably 80 to 99 wt. % and especially preferably from 90 to 99 wt. % t, which, in the form of a film with 25 μm thickness, displays a tensile strength until break in the longitudinal direction of more than 30 mPa, preferably more than 40 mPa, a tensile elongation until break in the longitudinal direction of more than 300%, preferably more than 350% and especially preferably of more than 380% and a secant modulus in the longitudinal direction at 1% tension of more than 80 mPa, preferably more than a 5 mPa, where the outer layers contain a mixture of polymer A and polymer B, where polymer B is selected from the group consisting of low density polyethylenes, the film having a thickness of 30 to 70 μm, preferably 35 to 60 μm and especially 40 to 55 μm and an elastic restoration capacity of more than 95% at an elongation of 55%.

According to the present invention, the problem above was furthermore solved at least in part by a foil, comprising at least one inner layer and two outer layers enclosing said at least one inner layer, where the, at least one, inner layer contains a polymer C in a quantity from 70 to 100 wt. %, preferably 80 to 99 wt. % and especially preferably from 90 to 99 wt. % t, relative to the total weight of the inner layer, wherein said polymer C is a vinylacetate polymer, preferably an ethylene vinylacetate copolymer. The outer layers contain a mixture of polymer A and polymer B, where polymer B is selected from the group consisting of low density polyethylenes, the film having a thickness of 30 to 70 μm, preferably 35 to 60 μm and especially 40 to 55 μm and an elastic restoration capacity of at least 80%, preferably at least 85%, at an elongation of 55%. It was found, according to the invention that a multi-layered film with the layer structure specified here is very well suited as a stretch-sleeve film. The film according to the invention is characterized by the presence of at least one inner layer, which is constructed from a polymer selected from the group consisting of a polymer A with very high elongation properties and very high elastic restoration capacity, and a polymer C from the group consisting of vinylacetate polymers, preferably ethylene vinyl acetate copolymers. It has been found that a film manufactured exclusively from polymer A or polymer C is unsuitable as a stretch-sleeve film since such a film would lack the necessary strength/stiffness and sealing strength. Only in combination with 2 outer layers enclosing at least one inner layer with a special composition could a film be created to solve the problem according to the invention.

The film of the invention is characterized by a low thickness of 30 to 70 μm, preferably 35 to 60 μm and especially 40 to 55 μm. Due to the possibility provided by the invention of being able to prepare a very thin film with the required properties of a stretch-sleeve film one can achieve considerable savings on material costs. According to an especially preferred variant of the present invention, the film has a total thickness of 50 µm. The thickness of the film is determined according to DIN 52370 at 23° C. and 50% RH.

The film of the invention is characterized by outstanding elastic properties due to the fact that it displays an elastic restoration capacity of at least 80% at an elongation of 55%. According to the invention, the film, especially preferably even at an elongation of up to 60-65%, still has an elastic restoration capacity of ≥90%. An especially preferred restoration capacity is exhibited by the film of the invention, if said at least one inner layer comprises a polymer A in a quantity from 70 to 100 wt. %, preferably 80 to 99 wt. % and especially preferably from 90 to 99 wt. % t, relative to the total weight of the inner layer. According to this embodiment, an elastic restoration capacity of more than 95% at an elongation of 55% can be obtained. Preferably, according to this embodiment, the film even exhibits an elastic restoration capacity of more than 90% at an elongation of 60-65%. According to an alternative embodiment of the invention, in which said at least one inner layer comprises a polymer C in a quantity from 70 to 100 wt. %, preferably 80 to 99 wt. % and especially preferably from 90 to 99 wt. %, relative to the total weight of the inner layer, wherein said polymer C is a vinylacetate polymer, preferably an ethylene vinylacetate copolymer, the film still exhibits a very good elastic restoration capacity of at least 80%, preferably at least 85%, at an elongation of 55%.

The elastic restoration capacity is defined according to the invention as the amount in percent by which the film approaches its original dimensions after an elongation has taken place. If the film according to the invention is stretched by 55% and relaxed, subsequently, the film according to the invention will remain elongated less than 5% above its original dimension (i.e. it has a residual elongation of less than 5%), i.e. the applied elongation is more than 90% restored. The elastic restoration capacity is determined according to ISO 527-3.

The film of the invention preferably has a tearing strength in the longitudinal and transverse direction (determined according to ISO 527-3 at 23° C. and 50% RH) greater than 30 N, in the case of a transparent film, greater than 20 N. The film of the invention preferably has a tearing strength in the longitudinal and transverse direction (determined according to ISO 527-3 at 23° C. and 50% RH) greater than 550% (longitudinal) and respectively greater than 650% (transversal), in the case of a transparent film of greater 500% (longitudinal, and greater 600% (transversal). The film of the invention preferably has a seam strength (determined according to ISO 527-3 at 23° C. and 50% RH) greater than 10 N/15 mm. The film of the invention preferably has a gliding friction (determined according to ISO 53375 at 23° C. and 50% RH) greater than 0.1-0.2.

According to a preferred embodiment of a film of the present invention, in which said at least one inner layer comprises a polymer C in a quantity from 70 to 100 wt. %, preferably 80 to 99 wt. % and especially preferably from 90 to 99 wt. % t, relative to the total weight of the inner layer, the film of the invention exhibits a tearing strength in the longitudinal and transverse direction (determined according to ISO 527-3 at 23° C. and 50% RH) of less than 400% (longitudinal) and respectively greater than 650% (transversal), preferably 300-380% (longitudinal) and respectively greater than 650% (transversal). It has been found that said embodiment of a film of the invention, with a polymer C as an essential component of said at least one inner layer, exhibits a particularly preferred tearing strength behavior, i.e. a low tearing strength in longitudinal direction and a high tearing strength in transversal direction.

The film of the invention is especially characterized by the combination of low thickness and high elastic restoration capacity.

The film of the invention has at least one inner layer. Depending on requirements and application, however, more than one inner layer may be present. According to the invention, the film preferably has an inner layer (3-layer film) or 3 inner layers (5-layer film).

According to one embodiment of the invention, all of the inner layers present contain polymer A or Polymer C in a quantity from 70 to 100 wt %, preferably 88 to 99 wt % and especially preferably from 90 to 99 wt %, relative to the total weight of the inner layer. According to this embodiment of the invention, all of the inner layers preferably display an identical chemical composition. The inner layers, depending on their composition, may have the same thickness or slightly mutually differing thicknesses, in which case each inner layer has a thickness in the range from 5 to 8 µm, preferably 6 to 7 µm.

According to another embodiment of the present invention, in the case of a film having several inner layers, not all of said inner layers are identically constructed. Preferably, in this embodiment inner layers adjacent to outer layers comprise the polymer A or polymer C in a quantity from 70 to 100 wt %, preferably 88 to 99 wt % and especially preferably from 90 to 99 wt %, relative to the total weight of the inner layer, whereas an inner layer enclosed by other inner layers comprises the polymer A or polymer C in a quantity from 40 to 80 wt %, preferably 50 to 70 wt % and especially preferably from 55 to 60 wt %, relative to the total weight of the inner layer. In this embodiment, an inner layer enclosed by other inner layers may comprise another polymer, in addition to polymer A or polymer C. Preferably, said other polymer is polymer B in a quantity from 10 to 50 wt %, preferably 15 to 45 wt % and especially preferably from 20 to 40 wt %, relative to the total weight of the inner layer.

Besides polymer A or polymer C, the, at least one, inner layer or all of the inner layers, may still have the additives ordinarily used during film production, e.g., lubricants, fillers and colorants. The additives according to the invention are preferably contained in a quantity from 30 to 0 wt. %, preferably 20 to 1 wt, % and especially preferably from 10 to 1 wt. % relative to the total weight of the inner layer.

The polymer A used according to the invention is characterized essentially by the following physical parameters: In the form of a film of 25 µm thickness it displays a tensile strength until break in the longitudinal direction of more than 30 MPa, preferably more than 40 MPa, a tensile elongation until break in the longitudinal direction of more than 300%, preferably more than 350% and especially preferably of more than 380% and a secant modulus in the longitudinal direction at 1% tension of more than 80 MPa, preferably more than 85 MPa.

The tensile strength at break is determined according to ASTM D882 or ISO 527-3. According to the invention, the measurement is conducted in the longitudinal direction, also called the machine direction (MD)

The tensile elongation at break is determined according to ASTM D882 or ISO 527-3. According to the invention, the measurement is conducted in the longitudinal direction, also called the machine direction (MD)

The secant modulus is defined as the ratio of tension to elongation at an arbitrary point on the curve of the tension-elongation diagram. It corresponds to the slope of a curve from the beginning up to an arbitrary point on the tension-elongation curve. The measurement is performed according to the invention in the longitudinal direction, also called the machine direction (MD), at a tension of 1%, according to ASTM D882 and respectively DIN EN ISO 527, 604 and 178.

It is also preferred according to the invention that the polymer A in the form of a film of 25 µm thickness display a strength of more than 50 J/cm$^3$, preferably more than 60 J/cm$^3$ in the longitudinal direction. The strength (toughness) is determined per invention according to ASTM D882. According to the invention, the measurement is conducted in the longitudinal direction, also called the machine direction (MD).

Numerous plastomers are suitable for use in the, at least one, inner layer, according to the invention. Polyethylene copolymers with the corresponding above-described physical properties are preferably used. Here, as examples, we can name copolymers of ethylene and α olefins. Preferably, this will involve copolymers of ethylene and long-chained α-olefins with a chain length of C4 to C20, such as, e.g., 1-hexene, 1-heptene, 1-octene or 1-nonene. According to the invention, polymer A is preferably a copolymer of ethylene and 1-octene.

Such copolymers and their production are well known. Polyethylene and copolymers of ethylene and α-olefins are usually prepared catalytically in the presence of suitable polymerization catalysts. For example, Ziegler-Natta catalysts, metallocene catalysts or post-metallocene catalysts may be mentioned, such as are known to the man of the art. Examples of post-metallocene catalysts are described in EP-0 416 815 A2 (polymerization catalysts with tents geometry, e.g., catalysts with bridged to amido-cyclopentadienyl ligands such as CBI (dimethylsilyl(tetramethyl-cyclopentadienyl)-t-butyldimethylamido-titanium (IV) dichloride)). By using these well-known catalysts, copolymers of ethylene and α-olefins can be prepared with dimensionally-tailored structure and desired properties. In particular, the quantity of α-olefin incorporated in the polymer, the molecular weight distribution and the polymer structure can be accurately adjusted.

According to the invention, for example, the copolymers of the Elite® series, preferably the Elite® AT series of the Dow Chemical Co. One can mention, for example, the copolymer Elite AT 6101 by the Dow Chemical Co.

The polymer C to be used according to the invention is a vinylacetate polymer. Vinylacetate polymers are known to those skilled in the art. According to the present invention, the term "vinylacetate polymer" encompasses homopolymers from the monomer vinylacetate, as well as copolymers from vinylacetate and at least one further monomer which is copolymerizable with vinylacetate. Preferably, said further monomer which is copolymerizable with vinylacetate is a chemical compound which comprises at least one carbon-carbon multiple bond, preferably a carbon-carbon double bond, and may be, preferably radically, copolymerized with vinylacetate.

According to a preferred embodiment, said polymer C is vinylacetate copolymer from vinylacetate and an alkene. Especially preferred according to the invention, the polymer C is an ethylene-vinylacetate copolymer. Ethylene-vinylacetate copolymers are known and commercially available. As an example, the ethylene-vinylacetate copolymer Greenflex® FF35 from Polymeri Europe may be mentioned. Said product comprises an amount of 9 wt.-% vinylacetate.

Another essential component of the film according to the invention is the outer layers, which enclose at least one inner layer. The outer layers impart to the inventive film the additional properties to the inner layer which impart to the film ultimately the advantageous properties for use as a stretch-sleeve film.

The outer layers preferably make up more than 50%, preferably more than 50 to 70% of the total thickness of the entire film. Each outer layer preferably has a thickness from 10 to 30 µm, preferably 10 to 25 µm, especially preferably 12 to 18 µm.

According to the present invention, each outer layer, contains a mixture of polymer A and a polymer B, where polymer B is selected from the group consisting of polyethylenes of low density (LDPE).

According to the invention, both outer layers preferably have the same chemical composition and especially preferably also the same thickness.

Polyethylenes of low density (LDPE) are well-known to the man of the art. These are thermoplastic homopolymers of ethylene. According to the invention, LDPE are characterized by a density in the range of about 0.919-0.932 g/cm$^3$. According to the invention, the LDPEs commonly used in film production may be employed. For example, the commercial products Lupolen 3220F and Lupolen 3020F by the Lyndell-Basell Co. and Riblene FF 34 by the Polymeri Europa Co. may be mentioned.

Depending on the property profile desired, the polymers A and Be may be mixed with each other in a broad ratio in the outer layers. According to the invention, the ratio of polymer A to polymer B may lie in a range from 80:20 to 20:80. The total quantity of polymer A and polymer B in an outer layer according to the invention is preferably 70 to 100 wt. %, preferably 80 to 99 wt. % and especially preferably from 90 to 99 wt. % relative to the total weight of the outer layer.

The outer layers may also display the additives commonly used in film production, e.g., lubricants, fillers, anti-blocking agents, antistatics, anti-fogging agents and pigments. The additives according to the invention are preferably contained in a quantity from 30 to 0 wt. %, preferably 20 to 1 wt, % and especially preferably from 10 to 1 wt. %, relative to the total weight of the outer layer.

The film of the invention may be prepared by known methods. As an example, and as a preferred variant, one can mention blow extrusion. In the blow extrusion process, which is basically well-known to the man of the art, the corresponding initial material is introduced into an extruder, melted in the extruder and fed through a narrow gap into a vertical pipe (tube). In the tube, the molten material is drawn apart and moved by compressed air out of the extruder as a film. Using the blow-extrusion process, a film consisting of several layers can be prepared by simultaneously extruding the corresponding layers and combining them in the extruder nozzle to form a single film.

The film, according to the invention is suitable, especially for use as a stretch-sleeve film, although other applications are also possible.

The stretch-sleeve process has already been described in the introduction. The application of stretch-sleeve films to articles such as packaging, especially bottles, and the machines necessary for this are known as state of the art. For example, one can refer to EP-2 316 738 A2 and EP-2 287 080 A2. The film of the invention is preferably prepared on an endless roll, especially in the form of a hose, cut to form a film part of the desired length and, if necessary (if not already present in this way) brought into a hose-like shape.

Alternatively, the film can also be produced from an endless strip with corresponding perforations, on which the film can be torn to the desired length. Using a tension device, the film shaped as a tube or hose can be stretched to the required degree and pulled over the article, such as packaging, e.g., for a bottle. The film is then relaxed and fits itself optimally on the outer surface of the article.

Therefore, the present invention also concerns a process for applying a film to an article such as packaging, including the steps:
  Providing the above-describe film, preferably on an endless roll as a hose-like (tubular) structure,
  Trimming or tearing off the film at a certain size.
  if necessary, shaping the cut-off film to form a hose-like structure,
  Stretching the thus-formed film to a dimension, preferably an inner diameter greater than the largest outside dimension, preferably the largest outside diameter of the article.
  Application of the film to the outer surface of the article.
  Releasing the tension on the applied film.

The invented film can very well be printed on by using the conventional printing process for this area. The Flexoprinting processes can be mentioned for this purpose.

Due to the advantageous properties of the invented film, by this method, articles such as packaging having demanding shapes can be prepared. For example, a bottle with grooves of different diameter may be mentioned.

The present invention therefore also involves an article, e.g., packaging, including the above-described film on at least part of its outer surface, preferably produced by the process described above.

It is preferable to apply this process to a bottle. It is especially preferred for the bottle to have an outer surface with segments of different diameter.

The present invention is explained in more detail below with reference to the preferred examples of embodiments and the drawings. They show:

ADDITIONAL BACKGROUND AND SUMMARY

Figure 1:
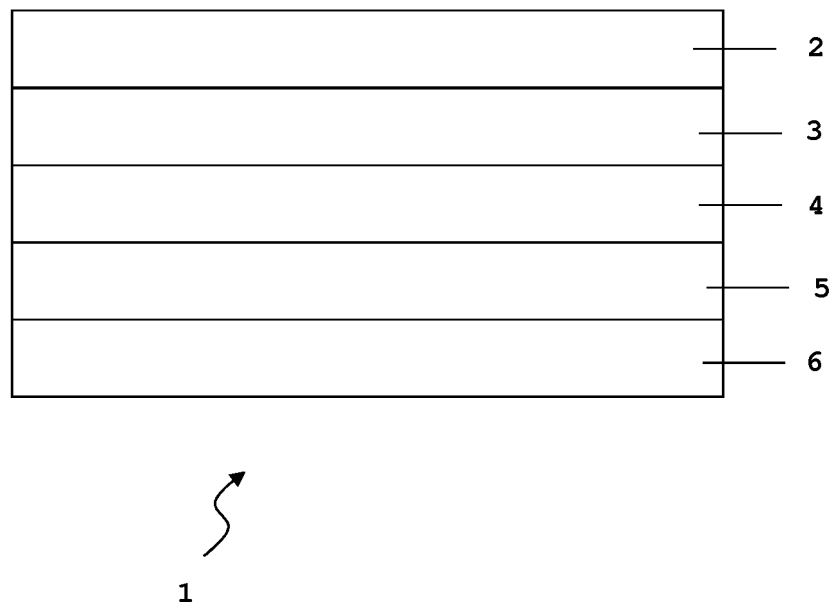
FIG. 1 is a schematic structure of one variant of the film, according to the invention

Stretch-sleeves provide a cost effective method for decorating complex shaped containers. They also enable the wall thickness of plastic containers to be reduced, eliminate the need for colored containers, and provide new types of promotional opportunities. Stretch-sleeves are able to achieve these benefits through the sleeve conforming tightly to the container shape. These many benefits have made stretch-sleeves one of the fastest growing label technologies in recent years.

Conventional stretch-sleeves, however, lack the stretchability to conform to highly contoured bottles and containers. A need therefore exists for stretch-sleeve films with improved properties, such as improved stretchability and elasticity, to meet the demand of containers with evergreater degrees of contour.

The present disclosure is directed to a stretch-sleeve film. In an embodiment, the stretch-sleeve film includes at least three layers including two skin layers and a core layer. The core layer includes at least 75 wt % of an ethylene/α-olefin copolymer (A) characterized by
  (i) a density from 0.890 g/cc to 0.920 g/cc;
  (ii) a Mw/Mn from 2.0 to 4.0;
  (iii) a ZSVR less than 6.0; and
  (iv) a CDC from 85 to 150.

At least one skin layer includes a polymeric material selected from the ethylene/α-olefin copolymer (A), a low density polyethylene, a medium density polyethylene, and combinations thereof.

In an embodiment, the stretch-sleeve film has an elastic recovery at 55% stretch of at least 95%.

The present disclosure is directed to an article. In an embodiment, the article includes a container and a stretch-sleeve film surrounding an outer surface of the container. The stretch-sleeve film includes at least three layers including two skin layers and a core layer. The core layer includes at least 75 wt % of an ethylene/α-olefin copolymer (A) characterized by
  (i) a density from 0.890 g/cc to 0.920 g/cc;
  (ii) a Mw/Mn from 2.0 to 4.0;
  (iii) a ZSVR less than 6.0; and
  (iv) a CDC from 85 to 150

At least one skin layer includes a polymeric material selected from the ethylene/α-olefin copolymer (A), a low density polyethylene, a medium density polyethylene, and combinations thereof.

In an embodiment, the stretch-sleeve film has an elastic recovery at 55% stretch of at least 95%.

The present disclosure is directed to a stretch-sleeve film. In an embodiment, the stretch-sleeve film includes at least three layers including two skin layers and a core layer. The core layer includes at least 75 wt % of an ethylene/α-olefin copolymer (A) characterized by
  (i) a density from 0.890 g/cc to 0.920 g/cc;
  (ii) a Mw/Mn from 2.0 to 4.0;
  (iii) a ZSVR less than 6.0; and
  (iv) a CDC from 85 to 150.

At least one skin layer includes a polymeric material selected from the ethylene/α-olefin copolymer (A), a low density polyethylene, a medium density polyethylene, and combinations thereof.

1. Stretch-Sleeve Film

The present disclosure provides a stretch-sleeve film. A "stretch-sleeve film," as used herein, is a tubular (or closed loop) single-piece film having an elastic recovery sufficient to compressively hold the stretch-sleeve in a set position on the outer surface of an object. The natural "memory" (elastic recovery) of the film material is sufficient to hold the stretch-sleeve in place by way of compressive friction-fit. A stretch-sleeve does not require an adhesive to stay in place on the outer surface of the object, such as a container, for example.

A stretch-sleeve is different than, and is distinct from, a shrink sleeve or a shrink wrap because a stretch-sleeve does not require exposure to heat (such as by way of a heat tunnel, for example) to trigger elastic recovery, or shrink.

A stretch-sleeve film is tubular in configuration and when applied, the stretch-sleeve film extends around the entire perimeter (or circumference) of an object (such as a container) to completely surround at least one cross-sectional (plane) perimeter of the target object.

Stretch-sleeve films are typically applied to objects (such as containers) with stretch-sleeve labeling machinery. When in place, the stretch-sleeve compresses (i.e., contracts) radially inward around the object, contacting the outer surface of the object. The stretch-sleeve applies a radially inward compressive force onto the outer surface of the object sufficient to adhere the stretch-sleeve to the object.

The stretch-sleeve film is also able to expand or contract with the object. Stretch-sleeve films find advantageous application as labels for containers (polymeric, glass, metal), squeeze bottles, carbonated beverage containers, hot-fill container, and cold-fill containers which typically exhibit container expansion and contraction.

2. Ethylene/α-olefin Copolymer (A)

The present stretch-sleeve film includes at least three layers including two skin layers and a core layer. The core layer includes at least 75 wt % of an ethylene/α-olefin copolymer (A). The ethylene/α-olefin copolymer (A) is an ethylene-based polymer. The term "ethylene-based polymer" is a polymer that contains more than 50 mole percent polymerized ethylene monomer (based on the total amount of polymerizable monomers) and contains at least one comonomer.

The ethylene/α-olefin copolymer (A) includes (a) less than 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers. The term "ethylene/α-olefin copolymer" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may be, for example, selected from the group consisting of propylene, 1-butene, 1-hexene, and 1-octene; or in the alternative, from the group consisting of 1-hexene and 1-octene.

The ethylene/α-olefin copolymer (A) is characterized by having a Comonomer Distribution Constant (CDC) in the range of from greater than from 45 to 400, for example from 75 to 300, or from 75 to 200, or from 85 to 150, or from 85 to 130.

The ethylene/α-olefin copolymer (A) is characterized by having a zero shear viscosity ratio (ZSVR) in the range of from 2 to 20, for example, from 2 to 10, or from 2 to 6, or from 2.5 to 4.

The ethylene/α-olefin copolymer (A) has a density in the range of 0.890 to 0.930 g/cc. For example, the density can be from a lower limit of 0.890, or 0.895, or 0.900, 0.901, 0.902, 0.903, or 0.904 g/cc to an upper limit of 0.910, or 0.920, or 0.925, or 0.930 g/cc.

The ethylene/α-olefin copolymer (A) has a molecular weight distribution ($M_w/M_n$) in the range of from 1.8 to 3.5. For example, the molecular weight distribution ($M_w/M_n$) can be from a lower limit of 1.8, 2, 2.1, or 2.2 to an upper limit of 2.5, 2.6, 2.7, 2.9, 3.2, or 3.5. The ethylene/α-olefin copolymer (A) has a melt index ($I_2$) in the range of 0.1 to 5 g/10 minutes. For example, the melt index ($I_2$) can be from a lower limit of 0.1, 0.2, 0.5, or 0.8 g/10 minutes to an upper limit of 1.2, 1.5, 1.8, 2.0, 2.2, 2.5, 3.0, 4.0, 4.5 or 5.0 g/10 minutes.

The ethylene/α-olefin copolymer (A) has a molecular weight ($M_w$) in the range of 50,000 to 250,000 Daltons. For example, the molecular weight ($M_w$) can be from a lower limit of 50,000, 60,000, 70,000 Daltons to an upper limit of 150,000, 180,000, 200,000 or 250,000 Daltons.

The ethylene/α-olefin copolymer (A) has a molecular weight distribution ($M_z/M_w$) in the range of less than 4, for example, less than 3, or from 2 to 2.8.

The ethylene/α-olefin copolymer (A) has a vinyl unsaturation of less than 0.15 vinyls per one thousand carbon atoms present in the backbone of the ethylene-based polymer composition.

The ethylene/α-olefin copolymer (A) has a long chain branching frequency in the range of from 0.02 to 3 long chain branches (LCB) per 1000 carbons (1000 C).

In one embodiment, the ethylene/α-olefin copolymer (A) comprises less than or equal to 100 parts, for example, less than 10 parts, less than 8 parts, less than 5 parts, less than 4 parts, less than 1 parts, less than 0.5 parts, or less than 0.1 parts, by weight of metal complex residues remaining from a catalyst system comprising a metal complex of a polyvalent aryloxyether per one million parts of the ethylene-based polymer composition. The metal complex residues remaining from the catalyst system comprising a metal complex of a polyvalent aryloxyether in the ethylene-based polymer composition may be measured by x-ray fluorescence (XRF), which is calibrated to reference standards. The polymer resin granules can be compression molded at elevated temperature into plaques having a thickness of about ⅜ of an inch for the x-ray measurement in a preferred method. At very low concentrations of metal complex, such as below 0.1 ppm, ICP-AES would be a suitable method to determine metal complex residues present in the ethylene-based polymer composition.

The ethylene/α-olefin copolymer (A) may further comprise additional components such as one or more other polymers and/or one or more additives. Such additives include, but are not limited to, antistatic agents, color enhancers, dyes, lubricants, fillers such as $TiO_2$ or $CaCO_3$, opacifiers, nucleators, processing aids, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. The ethylene/α-olefin copolymer (A) may contain from about 0.1 to about 10 percent by the combined weight of such additives, based on the weight of the ethylene/α-olefin copolymer including such additives.

In one embodiment, ethylene/α-olefin copolymer (A) has a comonomer distribution profile comprising a monomodal distribution or a bimodal distribution in the temperature range of from 35° C. to 120° C., excluding purge.

Any conventional ethylene (co)polymerization reaction processes may be employed to produce the ethylene-based polymer composition. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof.

In an embodiment, the ethylene/α-olefin copolymer (A) is prepared via a process comprising the steps of: (a) polymerizing ethylene and optionally one or more α-olefins in the presence of a first catalyst to form a semi-crystalline ethylene-based polymer in a first reactor or a first part of a multi-part reactor; and (b) reacting freshly supplied ethylene and optionally one or more α-olefins in the presence of a second catalyst comprising an organometallic catalyst thereby forming an ethylene/α-olefin interpolymer composition in at least one other reactor or a later part of a multi-part reactor, wherein at least one of the catalyst systems in step (a) or (b) comprises a metal complex of a polyvalent aryloxyether corresponding to the formula:

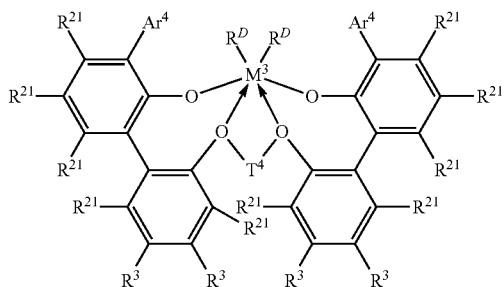

wherein $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks coplanarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

In an embodiment, the ethylene/α-olefin copolymer (A) is produced by way of a polyvalent aryloxyether (hereafter polyvalent aryloxyether-catalyzed HDPE) that is [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-Zirconium, represented by the structure (I) below.

Structure (I)

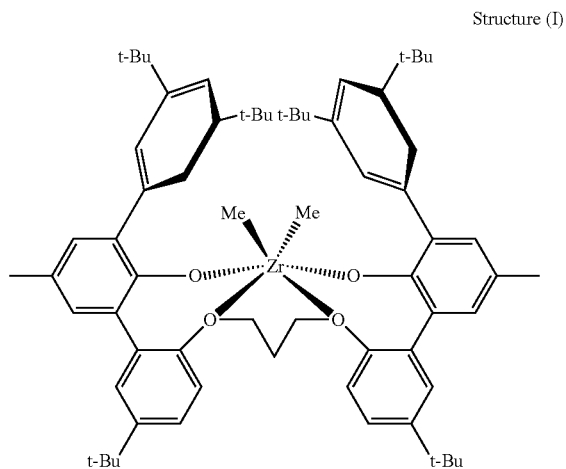

The ethylene/α-olefin copolymer (A) may be produced via a solution polymerization according to the following exemplary process.

All raw materials (ethylene, 1-octene) and the process solvent (a narrow boiling range high-purity isoparaffinic solvent commercially available under the tradename Isopar E from ExxonMobil Corporation) are purified with molecular sieves before introduction into the reaction environment. Hydrogen is supplied in pressurized cylinders as a high purity grade and is not further purified. The reactor monomer feed (ethylene) stream is pressurized via mechanical compressor to a pressure that is above the reaction pressure, approximate to 750 psig. The solvent and comonomer (1-octene) feed is pressurized via mechanical positive displacement pump to a pressure that is above the reaction pressure, approximately 750 psig. The individual catalyst components are manually batch diluted to specified component concentrations with purified solvent (Isopar E) and pressurized to a pressure that is above the reaction pressure, approximately 750 psig. All reaction feed flows are measured with mass flow meters, independently controlled with computer automated valve control systems.

The continuous solution polymerization reactor system may consist of two liquid full, non-adiabatic, isothermal, circulating, and independently controlled loops operating in a series configuration. Each reactor has independent control of all fresh solvent, monomer, comonomer, hydrogen, and catalyst component feeds. The combined solvent, monomer, comonomer and hydrogen feed to each reactor is independently temperature controlled to anywhere between 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at two locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining isothermal reaction environment at the specified temperature. Circulation around each reactor loop is provided by a screw pump. The effluent from the first polymerization reactor (containing solvent, monomer, comonomer, hydrogen, catalyst components, and molten polymer) exits the first reactor loop and passes through a control valve (responsible for maintaining the pressure of the first reactor at a specified target) and is injected into the second polymerization reactor of similar design. As the stream exits the reactor, it is contacted with a deactivating agent, e.g. water, to stop the reaction. In addition, various additives such as antioxidants, can be added at this point. The stream then goes through another set of static mixing elements to evenly disperse the catalyst deactivating agent and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified before entering the reactor again. The separated and devolatized polymer melt is pumped through a die specially designed for underwater pelletization, cut into uniform solid pellets, dried, and transferred into a hopper.

In an embodiment, the ethylene/α-olefin copolymer (A) has one, some or all of the following properties:
(i) a density from 0.890 g/cc to 0.920 g/cc;
(ii) a Mw/Mn from 2.0 to 4.0;
(iii) a ZSVR less than 6.0; and
(iv) a CDC from 85 to 150.

In an embodiment, the ethylene/α-olefin copolymer (A) is an ethylene/octene copolymer and has one, some or all of the following properties:
(i) a density from 0.900 g/cc to 0.91 g/cc;
(ii) a Mw/Mn from 2.0 to 3.0;
(iii) a ZSVR from 2.0 to 4.0;
(iv) a CDC from 100 to 130;
(v) an $I_2$ from 0.5 g/10 min to 1.5 g/10 min;
(vi) an $I_{10}/I_2$ from 7.5 to 8.5;
(vii) a vinyl unsaturation of less than 0.15 vinyls per 1000 carbon atoms;
(viii) a Tm from 97° C. to 103° C.; and
(ix) a heat of melting from 100 J/g to 110 J/g.

The present ethylene/α-olefin copolymer (A) may comprise two or more embodiments disclosed herein.

3. Skin Layers

The present stretch-sleeve film includes two skin layers. A "skin layer," as used herein, is the outermost layer of the film. The skin layers may be the same or may be different.

The skin layers are composed of a polymeric material selected from the ethylene/α-olefin copolymer (A) (described above), a low density polyethylene, a medium density polyethylene, and combinations thereof.

In an embodiment, the skin layers are composed of a polymeric material selected from the ethylene/α-olefin copolymer (A) (described above), a low density polyethylene, a medium density polyethylene a polyolefin plastomer, an ethylene vinyl acetate copolymer (EVA) with less the 5 wt % vinyl acetate (VA), and combinations thereof.

A "low density ethylene-based polymer" (or "LDPE") is an ethylene homopolymer having a density from 0.915 g/cc to 0.930 g/cc and is produced by way high pressure free radical polymerization, in a tubular, or autoclave process or hybrids thereof. The LDPE excludes linear low density polyethylene, excludes high density polyethylene (i.e., ethylene-based polymer with density greater than 0.94 g/cc) and excludes the ethylene/α-olefin copolymer (A).

The LDPE has an $M_w/M_n$ greater than 5.0, or greater than 6.0. In an embodiment, the LDPE has an $M_w/M_n$ with a lower limit from 6.0, or 7.0, or 8.0 to an upper limit from 10.0, or 11.0, or 12.0, or 13.0, or 14.0, or 15.0.

The LDPE has an $I_2$ from 0.1 g/10 min to 30 g/10 min, or 0.2 g/10 min to 15 g/10 min, or from 0.5 g/10 min to 5.0 g/10 min. In an embodiment, the LDPE has an $I_2$ from 1.0 g/10 min to 5.0 g/10 min.

In an embodiment, the LDPE has a density from 0.915 g/cc to 0.925 g/cc and a melt index from 0.5 g/10 min to 5.0 g/10 min.

In an embodiment, the LDPE is produced in a high-pressure tubular reactor ("HP-LDPE"). The HP-LDPE has a density from 0.915 g/cc, or 0.920 g/cc to 0.93 g/cc. The HP-LDPE has an $I_2$ from 0.5 g/10 min, or 1.0 g/10 min, or 2.0 g/10 min, to 3.0 g/10 min, or 4.0 g/10 min, or 5.0 g/10 min.

In an embodiment, the LDPE is a HP-LDPE (tubular) with one, some, or all of the following properties:
a density from 0.915 g/cc to 0.930 g/cc;
a $M_w/M_n$ from 5.0 to 7.0; and
an $I_2$ from 0.5 g/10 min to 5.0 g/10 min.

A "medium density polyethylene," (or "MDPE"), as used herein, is an ethylene-based polymer having a density range from 0.926 g/cc to less than 0.940 g/cc. MDPE can be produced by chromium/silica catalysts, Ziegler-Natta catalysts, constrained geometry catalysts or metallocene catalysts. The MDPE excludes LDPE, excludes HDPE, and excludes the ethylene/α-olefin copolymer (A).

The MDPE includes (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers.

The α-olefin comonomers typically have no more than 20 carbon atoms. For example, the α-olefin comonomers may have 3 to 10 carbon atoms, or 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In an embodiment, the one or more α-olefin comonomers may, for example, be selected from propylene, 1-butene, 1-hexene, and 1-octene, and combinations thereof. In a further embodiment, the one or more α-olefin comonomers are selected from 1-hexene, 1-octene, and combinations thereof.

The MDPE has a weight average molecular weight ($M_w$) in the range from 15,000 to 150,000 Daltons. For example, the molecular weight ($M_w$) can be from a lower limit of 15,000, 20,000, or 30,000 Daltons to an upper limit of 100,000, 120,000, or 150,000 Daltons.

The MDPE has a melt index (MI or $I_2$) in the range from 0.5 g/10 minutes (min) to 5.0 g/10 minutes. For example, the melt index ($I_2$) can be from a lower limit of 0.5, or 1.0, or 1.5 2.0, or 2.5 or g/10 minutes to an upper limit of 3.5 or 4.0, or 4.5, or 5.0 g/10 minutes.

Each of the ethylene/α-olefin copolymer (A), the MDPE and the LDPE may further include additional optional components such as one or more additives. Such additives include, but are not limited to, antistatic agents, color enhancers, dyes, lubricants, fillers, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof.

In an embodiment, the core layer of the stretch-sleeve film includes from 75 wt % to 100 wt % of the ethylene/α-olefin copolymer (A) and from 25 wt % to greater than 0 wt %, or 0 wt % of a polymeric material selected from a low density polyethylene, a medium density polyethylene, and combinations thereof. Weight percent is based on total weight of the core layer.

In an embodiment, the core layer includes from 75 wt % to 99 wt % of the ethylene/α-olefin copolymer (A) and from 25 wt % to 1 wt % of a LDPE.

In an embodiment, the core layer includes 100 wt % of the ethylene/α-olefin copolymer (A). Weight percent is based on total weight of the core layer.

In an embodiment, each skin layer is composed of the same polymeric material(s). The polymeric material for the skin layers is selected from the ethylene/α-olefin copolymer (A), a low density polyethylene, a medium density polyethylene, and combinations thereof.

In an embodiment, the stretch-sleeve film is a three layer film and consists of the two skin layers and the core layer (skin/core/skin).

In an embodiment, the stretch-sleeve film includes at least one inner layer. The inner layer is located between the core layer and a skin layer. The inner layer is composed of one or more polymeric materials selected from the ethylene/α-olefin copolymer (A), a low density polyethylene, a medium density polyethylene, and combinations thereof.

In an embodiment, the stretch-sleeve film includes at two inner layers. Each inner layer is located between the core layer and a skin layer. The inner layers can be the same or can be different. Each inner layer is composed of one or more polymeric materials selected from the ethylene/α-olefin copolymer (A), a low density polyethylene, a medium density polyethylene, and combinations thereof.

In an embodiment, the stretch-sleeve film is a three layer film with the following structure: A/B/C. In a further embodiment, the skin layers (A and C) are composed of the same material.

In an embodiment, the stretch-sleeve film is a five layer film with the following structure: A/B/C/D/E. In a further embodiment, the skin layers (A and E) are composed of the same material. In a further embodiment, the inner layers (B/C/D) are composed of the same material.

In an embodiment, the stretch-sleeve film is a seven layer film with the following structure: A/B/C/D/E/F/G. In a further embodiment, the skin layers (A and G) are composed of the same material. In a further embodiment, the inner layers (B/C/D/E/F) are composed of the same material.

In an embodiment, each skin layer has a thickness that is from 5% to 15% of the overall thickness of the stretch-sleeve film.

In an embodiment, the stretch-sleeve film has a thickness from 25 microns, or 30 microns, or 40 microns to 60 microns, or 70 microns, or 75 microns.

In an embodiment, the stretch-sleeve film has a thickness of 50 microns.

In an embodiment, stretch-sleeve film is a coextruded blown film.

The present stretch-sleeve film may be produced using any blown film extrusion or co-extrusion processes. Blown film extrusion processes are essentially the same as regular extrusion processes up until the die. The die in a blown film extrusion process is generally an upright cylinder with a circular opening similar to a pipe die. The diameter can be a few centimeters to more than three meters across. The molten plastic is pulled upwards from the die by a pair of nip rolls above the die (from 4 meters to 20 meters or more above the die depending on the amount of cooling required). Changing the speed of these nip rollers will change the gauge (wall thickness) of the film. Around the die sits an air-ring. The air-ring cools the film as it travels upwards. In the center of the die is an air outlet from which compressed air can be forced into the center of the extruded circular profile, creating a bubble. This expands the extruded circular cross section by some ratio (a multiple of the die diameter). This ratio, called the "blow-up ratio" or "BUR" can be just a few percent to more than 200 percent of the original diameter. The nip rolls flatten the bubble into a double layer of film whose width (called the "layflat") is equal to ½ the circumference of the bubble. This film can then be spooled or printed on, cut into shapes, and heat sealed into bags or other items.

In some instances a blown film line capable of producing a greater than desired number of layers may be used. For example, a five layer line may be used to produce a 3 layered stretch-sleeve film. In such cases, one or more of the stretch-sleeve film layers comprises two or more sub-layers, each sub-layer having an identical composition.

The present stretch-sleeve film has an elastic recovery at 55% stretch of at least 95%. A further embodiment, the stretch-sleeve film has an elastic recovery at 60% stretch of at least 95%. Bounded by no particular theory, Applicant discovered that the presence of at least 75 wt % of the ethylene/α-olefin copolymer (A) in the core layer improves elastic recovery. The present stretch-sleeve film also exhibits suitable film stiffness for effective sleeving operations, suitable sleeve sealing strength, and suitable optical properties for printability.

In an embodiment, the stretch-sleeve film has a tensile strength from 25 MPa to 40 MPa. In a further embodiment, the stretch-sleeve film has a tensile strength greater than 30 MPa, or greater than 30 MPa to 40 MPa.

In an embodiment, the stretch-sleeve film has a modulus of elasticity from 75 MPa to 200 MPa. In a further embodiment, the stretch-sleeve film has a modulus of elasticity of at least 95 MPa to 150 MPa.

4. Article

The present disclosure provides an article. In an embodiment, the article includes a container and the present stretch-sleeve film surrounds an outer circumference of the container. The stretch-sleeve film may be any stretch-sleeve film as previously discussed herein.

The container may be made of metal, wood, glass, or a polymeric material (such as HDPE or PET). In an embodiment, the container is a bottle. Nonlimiting examples of suitable bottles include squeeze bottle, carbonated beverage bottle, hot-fill bottle, and cold-fill bottle.

In an embodiment, the stretch-sleeve film is compressively engaged to the outer container surface with a holding force expressed as tensile strength from 4 MPa to 10 MPa at elongation from 5% to 60%.

In an embodiment, the stretch-sleeve film includes printing (such as branding, for example).

In an embodiment, the stretch-sleeve film includes a colorant.

In an embodiment, the stretch-sleeve film includes a point of weakness to facilitate removal of the stretch-sleeve film from the container.

In an embodiment, the stretch-sleeve film is a high-contour stretch-sleeve film. A "high-contour stretch-sleeve film," as used herein, is a stretch-sleeve film wherein the stretched diameter (sleeve is stretched radially outward, or "stretched diameter") of the stretch-sleeve film is at least 50% greater than the unstretched sleeve (sleeve is unstretched radially, or "unstretched diameter"). In a further embodiment, the high-contour stretch-sleeve film has a stretched diameter at least 50%, or 55%, or 60%, or 65% greater than the unstretched diameter.

The present stretch-sleeve film molds into the contours of a shaped container, a shaped bottle or jar without the need for heat or glue application. The present stretch-sleeve film, and the present high-contour stretch-sleeve film in particular, is suitable to mold to the contours of a high-contour container. A "high-contour container," as used herein, is a container or bottle, where the difference in largest to smallest diameter along the height of the container or bottle covered by a sleeve exceeds 50%. In an embodiment, a high-contour container includes radial ribs separated by 0.5 millimeter (mm), or 1 mm, or 2 mm, or 3 mm, or 4 mm, or 5 mm to 6, mm, or 7 mm, or 8 mm, or 9 mm, or 10 mm.

Non-limiting examples of suitable articles include food products (dairy containers, juice containers, energy drink bottles, carbonated beverage bottles, non-carbonated beverage bottles, alcohol beverage bottles) and condiment containers.

Definitions

The terms "comprising", "including", "having" and their derivatives do not exclude the presence of any additional component or procedure. The term, "consisting essentially of" excludes any other component or procedure, except those essential to operability. The term "consisting of" excludes any component or procedure not specifically stated.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

Test Methods

Density

Samples that are measured for density are prepared according to ASTM D-1928. Measurements are made within one hour of sample pressing using ASTM D-792, Method B.

Elastic recovery and modulus of elasticity are measured in accordance with ASTM D5459-95 (Reapproved 2012); Standard Test Method for Machine Direction Elastic Recovery and Permanent Deformation and Stress Retention of Stretch Wrap Film; modified for stretch labels as follow:

Specimen width: 15 mm
Gap distance: 150 mm
Test speed to desired elongation: 500 mm/minute (min)
Holding time at elongation: 3 seconds
Return speed: 500 mm/min
Holding time @ 0% elongation: 6 seconds
Speed to get minimum force of 0.1N/15 mm: 100 mm/min Tensile strength is measured in accordance with ISO 527-3: 1995; Plastics—Determination of tensile properties with the following conditions used:

Specimen: Type 2
Test speed: 5 mm/min
Grips: Convex
Grip distance: 100 mm

Holding force (expressed as tensile strength) is determined in accordance with ISO 527-3:1995; Plastics—Determination of tensile properties with the following conditions:

Specimen: Type 1
Test speed: 5 mm/min
Grips: Convex
Grip distance: 100 mm

Melt Index

Melt index (MI), or $I_2$, is measured in accordance with ASTM-D 1238, Condition 190° C./2.16 kg, and is reported in grams eluted per 10 minutes. $I_{10}$ is measured in accordance with ASTM-D 1238, Condition 190° C./10 kg, and is reported in grams eluted per 10 minutes.

Gel Permeation Chromatography (GPC)

The Gel Permeation Chromatography (GPC) system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, *J. Polym. Sci.*, Polym. Letters, 6, 621 (1968)):

$$M_{polyethylene} = A \times (M_{polystyrene})^B,$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

The moments of the molecular weight distribution, $M_n$ (number-average molecular weight), $M_w$ (weight-average molecular weight) and $M_z$ (z-average molecular weight) are computed from the data as follows, where $W_i$ is weight fraction of species with molecular weight $M_i$:

$$M_n = \frac{\sum_i W_i}{\sum_i (W_i/M_i)} \quad M_w = \frac{\sum_i W_i \cdot M_i}{\sum_i W_i}$$

$$M_z = \frac{\sum_i W_i \cdot M_i^2}{\sum_i W_i \cdot M_i}$$

Differential Scanning Calorimetry

Measurements are performed with a TA instruments Q1000 DSC, equipped with an RCS (refrigerated cooling system) and an autosampler. Each sample is first melt pressed into a thin film at 175° C.; the melted sample is then air-cooled to room temperature. A 3-10 mg, 6 mm diameter specimen is extracted from the cooled polymer, weighed, placed in a light aluminum pan (ca 50 mg), and crimped shut. The thermal behavior of the sample is determined by ramping the sample temperature up and down to create a heat flow versus temperature profile. During testing, a nitrogen purge gas flow of 50 ml/min is used. First, the sample is rapidly heated to 180° C. and held isothermal for 3 min in order to remove its thermal history. Next, the sample is cooled to −40° C. at 10° C./min cooling rate and held isothermal at −40° C. for 3 min. The sample is then heated to 150° C. (2nd heating scan) at a 10° C./min heating rate. The cooling and heating (2nd scan) curves are recorded. The cooling curve is analyzed by setting baseline endpoints from the beginning of the crystallization to −20° C. The heating curve is analyzed by setting baseline endpoints from −20° C. to the end of the melt. The values determined are peak melting temperature (Tm), peak crystallization temperature (Tc), heat of fusion (Hf) (in J/g) and heat of crystallization (Hc) (in J/g).

Crystallization Elution Fractionation (CEF) Method: Comonomer distribution analysis is performed with Crystallization Elution Fractionation (CEF) (PolymerChar in Spain) (B Monrabal et al, Macromol Symp. 257, 71-79 (2007)). Ortho-dichlorobenzene (ODCB) with 600 ppm antioxidant butylatedhydroxytoluene (BHT) is used as solvent. Sample preparation is done with autosampler at 160° C. for 2 hours under shaking at 4 mg/ml (unless otherwise specified). The injection volume is 300 µl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second. CEF column is packed by the Dow Chemical Company with glass beads at 125 µm±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in the following equation:

$$\text{Resolution} = \frac{\text{Peak temperature of } NIST\ 1475a - \text{Peak Temperature of Hexacontane}}{\text{Half-height Width of } NIST\ 1475a + \text{Half-height Width of Hexacontane}}$$

where the column resolution is 6.0.

Comonomer Distribution Constant (CDC) Method: Comonomer distribution constant (CDC) is calculated from comonomer distribution profile by CEF. CDC is defined as Comonomer Distribution Index divided by Comonomer Distribution Shape Factor multiplying by 100 as shown in the following equation:

$$CDC = \frac{\text{Comonomer Distrubution Index}}{\text{Comonomer Distribution Shape Factor}} = \frac{\text{Comonomer Distribution Index}}{\text{Half Width}/Stdev} * 100$$

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated from comonomer distribution profile by CEF, and CDC is defined as Comonomer Distribution Index divided by Comonomer Distribution Shape Factor multiplying by 100 as shown in the following Equation:

$$CDC = \frac{\text{Comonomer } Distrubution \text{ Index}}{\text{Comonomer Distribution Shape Factor}} = \frac{\text{Comonomer Distribution Index}}{\text{Half Width}/Stdev} * 100$$

wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature ($T_p$).

CDC is calculated according to the following steps:
(A) Obtain a weight fraction at each temperature (T) (wT(T)) from 35.0° C. to 119.0° C. with a temperature step increase of 0.200° C. from CEF according to the following Equation:
(B) Calculate the median temperature ($T_{median}$) at cumulative weight fraction of 0.500, $$\int_{35}^{119.0} w_T(T) dT = 1$$

according to the following Equation:
(C) Calculate the corresponding median comonomer content in mole % ($C_{median}$) at $$\int_{35}^{T_{median}} w_T(T)dT = 0.5$$

the median temperature ($T_{median}$) by using comonomer content calibration curve according to the following Equation:

$$\ln(1 - comonomercontent) = -\frac{207.26}{273.12 + T} + 0.5533$$

$$R^2 = 0.997$$

(D) Construct a comonomer content calibration curve by using a series of reference materials with known amount of comonomer content, i.e., eleven reference materials with narrow comonomer distribution (monomodal comonomer distribution in CEF from 35.0 to 119.0° C.) with weight average $M_w$ of 35,000 to 115,000 (measured via conventional GPC) at a comonomer content ranging from 0.0 mole % to 7.0 mole % are analyzed with CEF at the same experimental conditions specified in CEF experimental sections;
(E) Calculate comonomer content calibration by using the peak temperature ($T_p$) of each reference material and its comonomer content; The calibration is calculated from each reference material according to the following Equation:

$$\ln(1 - comonomercontent) = -\frac{207.26}{273.12 + T} + 0.5533$$

$$R^2 = 0.997$$

wherein: $R^2$ is the correlation constant;
(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;
(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from I 19.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak;
(H) Calculate the standard deviation of temperature (Stdev) according the following Equation:

$$Stdev = \sqrt{\sum_{35.0}^{119.0} (T - T_p)^2 * w_T(T)}$$

Creep Zero Shear Viscosity Measurement Method

Zero-shear viscosities are obtained via creep tests that are conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 µm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29 \times 10^{-15} M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc is established based on a series of linear polyethylene reference materials. A description for the ZSV-Mw relationship can be found in the ANTEC proceeding: Karjala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-$d_2$ (TCE) and perchloroethylene (50:50, w:w) with 0.001M $Cr^{3+}$. The solution in the tube is purged with $N_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR is run with a 10 mm cryoprobe at 120° C. on Bruker AVANCE 400 MHz spectrometer.

Two experiments are run to get the unsaturation: the control and the double presaturation experiments. For the control experiment, the data is processed with exponential window function with LB=1 Hz, baseline is corrected from 7 to −2 ppm. The signal from residual $^1$H of TCE is set to 100, the integral $I_{total}$ from −0.5 to 3 ppm is used as the signal from whole polymer in the control experiment. The number of $CH_2$ group, $NCH_2$, in the polymer is calculated as following:

$$NcH_2 = I_{total}/2$$

For the double presaturation experiment, the data is processed with exponential window function with LB=1 Hz, baseline is corrected from 6.6 to 4.5 ppm. The signal from residual $^1$H of TCE is set to 100, the corresponding integrals for unsaturations ($I_{vinylene}$, $I_{trisubstituted}$, $I_{vinyl}$ and $I_{vinylidene}$) are integrated based on the region shown in FIG. 4.

The number of unsaturation unit for vinylene, trisubstituted, vinyl and vinylidene are calculated:

$$N_{vinylene} = I_{vinylene}/2$$

$$N_{trisubstituted} = I_{trisubstitute}$$

$$N_{vinyl} = I_{vinyl}/2$$

$$N_{vinylidene} = I_{vinylidene}/2$$

The unsaturation unit/1,000,000 carbons is calculated as following:

$$N_{vinylene}/1,000,000C = (N_{vinylene}/NCH_2)*1,000,000$$

$$N_{trisubstituted}/1,000,000C = (N_{trisubstituted}/NCH_2)*1,000,000$$

$$N_{vinyl}/1,000,000C = (N_{vinyl}/NCH_2)*1,000,000$$

$$N_{vinylidene}/1,000,000C = (N_{vinylidene}/NCH_2)*1,000,000$$

The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE 400 MHz spectrometer are shown below:

```
;lc1prf2_zz
prosol relations=<lcnmr>
#include <Avance.incl>
"d12=20u"
"d11=4u"
1 ze
d12 pl21:f2
2 30m
d13
d12 pl9:f1
d1 cw:f1 ph29 cw:f2 ph29
d11 do:f1 do:f2
d12 pl1:f1
p1 ph1
go=2 ph31
30m mc #0 to 2 F0(zd)
exit
ph1=0 2 2 0 1 3 3 1
ph29=0
ph31=0 2 2 0 1 3 3 1
```

Preparation of Blends by Twin Screw Extruder Compounding

Blends are prepared with a 30 mm co-rotating, intermeshing Coperion Werner-Pfleiderer ZSK-30 (ZSK-30) twin screw extruder. The ZSK-30 has ten barrel sections with an overall length of 960 mm and a 32 length to diameter ratio (L/D). The temperature in the feed zone is 80° C. Zones 1 to 4 are set at 160, 180, 185 and 190° C., respectively. The die temperature is 230° C. The screw speed is set at 325 rpm resulting in an output rate of approximately 18.14 kg/hr (40 lb/hr).

EXAMPLE 1

A film is prepared with the structure shown in FIG. 1. The film 1 consists of a total of 5 layers. 3 inner layers, 3, 4 and 5 are arranged between the outer layers 2 and 6. The layers display the following structure:

| Layer No. | Composition | Wt. % | Thickness (µm) |
|---|---|---|---|
| 2 | Polymer A (Elite At 6101) | 63.5 | 15 |
|  | Polymer B (Riblene FF 34) | 20.0 |  |
|  | Colorant (white) | 14.0 |  |
|  | Sliding/anti-blocking agent | 2.0 |  |
|  | Antistatic agent | 0.5 |  |
| 3 | Polymer A (Elite At 6101) | 98.0 | 7 |
|  | Lubricant | 2.0 |  |
| 4 | Polymer A (Elite At 6101) | 86.0 | 6 |
|  | Lubricant | 2.0 |  |
|  | Colorant (white) | 12.0 |  |
| 5 | Polymer A (Elite At 6101) | 98.0 | 7 |
|  | Lubricant | 2.0 |  |
| 6 | Polymer A (Elite At 6101) | 63.5 | 15 |
|  | Polymer B (Riblene FF 34) | 20.0 |  |
|  | Dyestuff (white, NG 8600 H1) | 14.0 |  |
|  | Sliding/anti-blocking agent | 2.0 |  |
|  | Antistatic agent | 0.5 |  |

The layers were fabricated by using the conventional blow-extrusion process into a 5-layered film.

Figure 2:
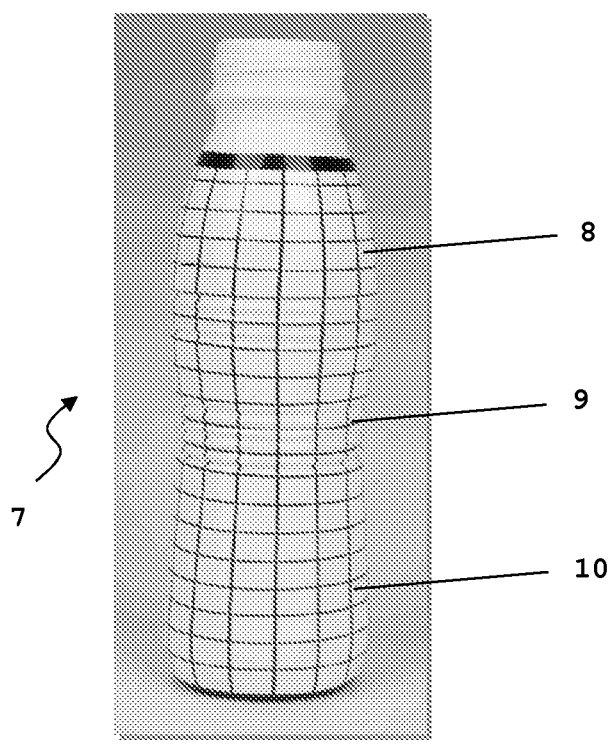
FIG. 2 is a representation of a bottle provided with the film of the invention

The film thus produced was applied to a bottle (7) using a stretch-sleeve machine. In FIG. 2. The bottle (7) with the film of the invention provided on its outer surface is shown. The bottle has a contour with the segments of different diameter (8, 9, 10). As FIG. 2 shows, the film of the invention according to example 1 clings optimally to the outer surface of the bottle (7).

Figures 3, 4:
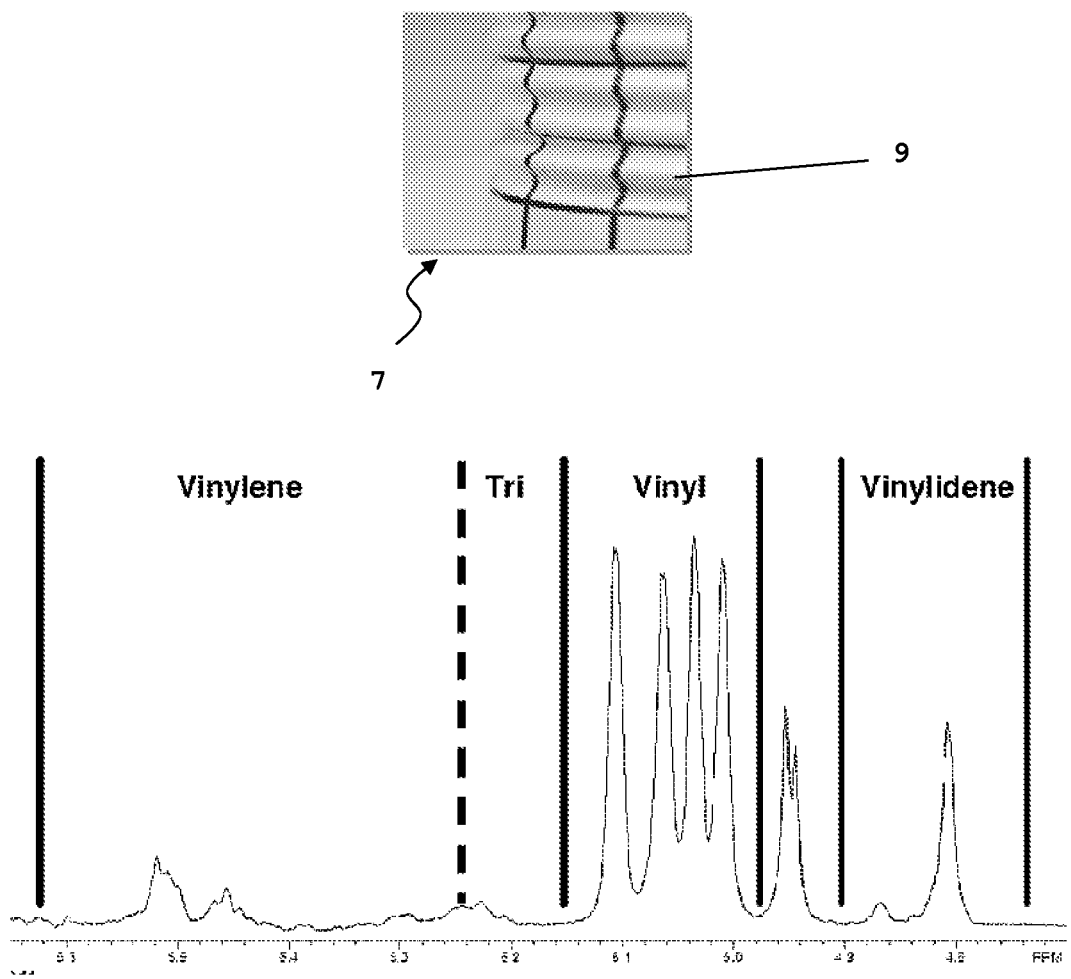
FIG. 3 is an improved representation of the grooves on the bottle, according to FIG. 2.
FIG. 4 is an NMR spectrograph showing the resins analyzed for the determination of unsaturation.

FIG. 3 shows an enlarged representation of the segment (9) of the bottle (7) in FIG. 2. One recognizes that the inventive film in this segment also with a complicated contour fits optimally on the outer surface of the bottle (7).

EXAMPLE 2

A film is prepared with the structure shown in FIG. 1 as is described in example 1. The film 1 consists of a total of 5 layers. Inner layers, 3, 4 and 5 are arranged between the outer layers 2 and 6. The layers display the following structure:

| Layer No. | Composition | Wt. % | Thickness (μm) |
|---|---|---|---|
| 2 | Polymer A (Elite At 6101) | 20.0 | 15 |
|   | Polymer B (Lupolen 3220F) | 76.5 |  |
|   | Sliding/anti-blocking agent | 2.0 |  |
|   | Antistatic agent | 0.5 |  |
|   | ARX 601 AB 05 | 1.0 |  |
| 3 | Polymer A (Elite At 6101) | 98.0 | 7 |
|   | Lubricant | 2.0 |  |
| 4 | Polymer A (Elite At 6101) | 98.0 | 6 |
|   | Lubricant | 2.0 |  |
| 5 | Polymer A (Elite At 6101) | 98.0 | 7 |
|   | Lubricant | 2.0 |  |
| 6 | Polymer A (Elite At 6101) | 20.0 | 15 |
|   | Polymer B (Lupolen 3220F) | 76.5 |  |
|   | Sliding/anti-blocking agent | 2.0 |  |
|   | Antistatic agent | 0.5 |  |
|   | ARX 601 AB 05 | 1.0 |  |

The layers were fabricated by using a conventional blow-extrusion process into a 5-layered film. The film thus produced was applied to a bottle (7) using a conventional stretch-sleeve machine. The results corresponded to the results described in Example 1.

EXAMPLE 3

A film is prepared with the structure shown in FIG. 1 as is described in example 1. The film 1 consists of a total of 5 layers. Inner layers, 3, 4 and 5 are arranged between the outer layers 2 and 6. The layers display the following structure:

| Layer No. | Composition | Wt. % | Thickness (μm) |
|---|---|---|---|
| 2 | Polymer A (Elite At 6101) | 46.5 | 15 |
|   | Polymer B (Lupolen 3220F) | 50.0 |  |
|   | Sliding/anti-blocking agent | 2.0 |  |
|   | Antistatic agent | 0.5 |  |
|   | ARX 601 AB 05 | 1.0 |  |
| 3 | Polymer A (Elite At 6101) | 80.0 | 7 |
|   | Polymer B (Lupolen 3220F) | 20.0 |  |
| 4 | Polymer A (Elite At 6101) | 78.0 | 6 |
|   | Polymer B (Lupolen 3220F) | 20.0 |  |
|   | Lubricant | 2.0 |  |
| 5 | Polymer A (Elite At 6101) | 80.0 | 7 |
|   | Polymer B (Lupolen 3220F) | 20.0 |  |
| 6 | Polymer A (Elite At 6101) | 46.5 | 15 |
|   | Polymer B (Lupolen 3220F) | 50.0 |  |
|   | Sliding/anti-blocking agent | 2.0 |  |
|   | Antistatic agent | 0.5 |  |
|   | ARX 601 AB 05 | 1.0 |  |

The layers were fabricated by using a conventional blow-extrusion process into a 5-layered film. The film thus produced was applied to a bottle (7) using a conventional stretch-sleeve machine. The results corresponded to the results described in Example 1.

EXAMPLE 4

A film is prepared with the structure shown in FIG. 1 as is described in example 1. The film 1 consists of a total of 5 layers. Inner layers, 3, 4 and 5 are arranged between the outer layers 2 and 6. The layers display the following structure:

| Layer No. | Composition | Wt. % | Thickness (μm) |
|---|---|---|---|
| 2 | Polymer A (Elite At 6101) | 50.0 | 15 |
|   | Polymer B (Lupolen 3020F) | 46.5 |  |
|   | Sliding/anti-blocking agent | 2.0 |  |
|   | Antistatic agent | 0.5 |  |
|   | ARX 601 AB 05 | 1.0 |  |
| 3 | Polymer C (Greenflex FF 35) | 98.0 | 7 |
|   | Lubricant | 2.0 |  |
| 4 | Polymer C (Greenflex FF 35) | 58.0 | 6 |
|   | Polymer B (Lupolen 3020F) | 40.0 |  |
|   | Lubricant | 2.0 |  |
| 5 | Polymer C (Greenflex FF 35) | 98.0 | 7 |
|   | Lubricant | 2.0 |  |
| 6 | Polymer A (Elite At 6101) | 50.0 | 15 |
|   | Polymer B (Lupolen 3020F) | 46.5 |  |
|   | Sliding/anti-blocking agent | 2.0 |  |
|   | Antistatic agent | 0.5 |  |
|   | ARX 601 AB 05 | 1.0 |  |

The layers were fabricated by using a conventional blow-extrusion process into a 5-layered film. The film thus produced was applied to a bottle (7) using a conventional stretch-sleeve machine. The results corresponded to the results described in Example 1.

For the films according to examples 3 and 4, the tensile elongation at break was determined according to ISO 527-3 at 23° C. and 50% RH in longitudinal and transversal direction. The following results were obtained (average of 3 to 6 measurements):

|  | tensile elongation at break longitudinal (%) | tensile elongation at break transversal (%) |
|---|---|---|
| Example 3 | 497.5 | 663.8 |
| Example 4 | 377.9 | 656.6 |

The film according to example 4, in which the inner layers comprise polymer C as main component, exhibit a significantly improved (lower) tensile elongation at break in longitudinal direction, with a comparable tensile elongation at break in transversal direction.

EXAMPLE 5

A film is prepared with the structure shown in FIG. 1 as is described in example 1. The film 1 consists of a total of 5 layers. Inner layers, 3, 4 and 5 are arranged between the outer layers 2 and 6. The layers display the following structure:

| Layer No. | Composition | Wt. % | Thickness (μm) |
|---|---|---|---|
| 2 | Polymer A (Elite At 6101) | 20.0 | 15 |
|   | Polymer B (Lupolen 3020F) | 76.5 |  |
|   | Sliding/anti-blocking agent | 2.0 |  |
|   | Antistatic agent | 0.5 |  |
|   | ARX 601 AB 05 | 1.0 |  |

-continued

| Layer No. | Composition | Wt. % | Thickness (μm) |
|---|---|---|---|
| 3 | Polymer C (Greenflex FF 35) | 98.0 | 7 |
|   | Lubricant | 2.0 | |
| 4 | Polymer C (Greenflex FF 35) | 98.0 | 6 |
|   | Lubricant | 2.0 | |
| 5 | Polymer C (Greenflex FF 35) | 98.0 | 7 |
|   | Lubricant | 2.0 | |
| 6 | Polymer A (Elite At 6101) | 20.0 | 15 |
|   | Polymer B (Lupolen 3020F) | 76.5 | |
|   | Sliding/anti-blocking agent | 2.0 | |
|   | Antistatic agent | 0.5 | |
|   | ARX 601 AB 05 | 1.0 | |

The layers were fabricated by using a conventional blow-extrusion process into a 5-layered film. The film thus produced was applied to a bottle (7) using a conventional stretch-sleeve machine. The results corresponded to the results described in Example 1.

ADDITIONAL EXAMPLES

1. Materials

Materials for the additional examples and comparative examples are listed in Table 1 below.

TABLE 1

| Designation | | Density (g/cc) | $I_2$ (dg/min) | Mw/Mn |
|---|---|---|---|---|
| ELITE AT 6101 | Enhanced Polyethylene Resin | 0.904 | 0.7 | 2.62 |
| ATTANE SL4102G | Ultra Low Density Polyethylene | 0.905 | 1.0 | |
| AFFINITY PF 1140G | Polyolefins Plastomer | 0.918 | 1.6 | |
| LDPE (HP-tubular) | Polyethylene Low Density | 0.918 | 2.3 | |
| INFUSE Olefin block copolymer | Ethylene/octene multi-block copolymer | 0.877 | 0.5 | |
| EVA | Ethylene Vinyl Acetate Copolymer | 0.929 | 0.7 | |

ELITE AT 6101 (or 6101) is an ethylene/octene copolymer and an embodiment of the ethylene/α-olefin copolymer (A). The properties for ELITE AT6101 are provided in Table 2 below.

TABLE 2

| Designation | Units | 6101 |
|---|---|---|
| Density | (g/cc) | 0.904 |
| $I_2$ | (dg/min) | 0.7 |
| $I_{10}/I_2$ | | 7.7 |
| $M_w/M_n$ | | 2.62 |
| $M_w$ | ×10³ | |
| $M_z$ | ×10³ | 223643 |
| CDC | | 127.9 |
| CDI | | 89.1 |
| ZSVR | | 3.11 |
| Vinyls/10³ C | | Less than 0.15 |

Comparative samples A-E and inventive example 1 stretch-sleeve films with 50 micron total thickness are produced on a 7-layer Collin blown film line under standard processing conditions. The structural and compositional features of the stretch-sleeve films for comparative samples A-E and the inventive example 1 are provided in Table 3 below.

TABLE 3

| | Comparative A<br>Attane SL 4102G (0.905; 1.0)<br>core layer | | | | Comparative B<br>Attane SL 4102G (0.905; 1.0)<br>30% Versify 2300 core layer | | | | Inventive Example<br>6101 (0.905; 0.8)<br>core layer | | | |
|---|---|---|---|---|---|---|---|---|---|---|---|---|
| Design Total Gauge Layer A | 50 Amount | μm Component | Density g/cm¹ | Design Total Gauge Layer A | 50 Amount | μm Component | Density g/cm¹ | Design Total Gauge Layer A | 50 Amount | μm Component | Density g/cm¹ |
| 1 | 98.0% | LDPE 770G | 0.918 | 1 | 98.0% | LDPE 770G | 0.918 | 1 | 98.0% | LDPE 770G | 0.918 |
| 2 | 2.0% | Polybatch | 0.982 | 2 | 2.0% | Polybatch FSU | 0.982 | 2 | 2.0% | Polybatch FSU | 0.982 |
| 3 | 0.0% | FSU 1051 | 0.000 | 3 | 0.0% | 1051 | 0.000 | 3 | 0.0% | 1051 | 0.000 |
| 4 | 0.0% | | 0.000 | 4 | 0.0% | | 0.000 | 4 | 0.0% | | 0.000 |
| Total | 100.0% | | 0.9192 | Total | 100.0% | | 0.9192 | Total | 100.0% | | 0.9192 |
| Layer B | Amount | Component | g/cm¹ | Layer B | Amount | Component | g/cm¹ | Layer B | Amount | Component | g/cm¹ |
| 1 | 98.0% | ATTANE | 0.905 | 1 | 68.0% | ATTANE SL | 0.905 | 1 | 98.0% | 6101 | 0.905 |
| 2 | 2.0% | SL 4102G | 0.922 | 2 | 30.0% | 4102G | 0.866 | 2 | 2.0% | Polybatch CE | 0.922 |
| 3 | 0.0% | Polybatch | 0.000 | 3 | 2.0% | VERSIFY 2300 | 0.922 | 3 | 0.0% | 505E | 0.000 |
| 4 | 0.0% | CE 505E | 0.000 | 4 | 0.0% | Polybatch | 0.000 | 4 | 0.0% | | 0.000 |
| Total | 100.0% | | 0.9053 | Total | 100.0% | | CE 505E | 0.8933 | Total | 100.0% | | 0.9053 |
| Layer C | Amount | Component | g/cm¹ | Layer C | Amount | Component | g/cm¹ | Layer C | Amount | Component | g/cm¹ |
| 1 | 98.0% | ATTANE | 0.906 | 1 | 68.0% | ATTANE SL | 0.905 | 1 | 98.0% | 6101 | 0.905 |
| 2 | 2.0% | SL 4102G | 0.922 | 2 | 30.0% | 4102G | 0.866 | 2 | 2.0% | Polybatch CE | 0.922 |
| 3 | 0.0% | Polybatch | 0.000 | 3 | 2.0% | VERSIFY 2300 | 0.922 | 3 | 0.0% | 505E | 0.000 |
| 4 | 0.0% | CE 505E | 0.000 | 4 | 0.0% | Polybatch | 0.000 | 4 | 0.0% | | 0.000 |
| Total | 100.0% | | 0.9053 | Total | 100.0% | | CE 505E | 0.8933 | Total | 100.0% | | 0.9053 |

TABLE 3-continued

| Layer D | Amount | Component | g/cm¹ | Layer D | Amount | Component | g/cm¹ | Layer D | Amount | Component | g/cm¹ |
|---|---|---|---|---|---|---|---|---|---|---|---|
| 1 | 98.0% | ATTANE | 0.905 | 1 | 68.0% | ATTANE SL | 0.905 | 1 | 98.0% | 6101 | 0.905 |
| 2 | 2.0% | SL 4102G | 0.922 | 2 | 30.0% | 4102G | 0.866 | 2 | 2.0% | Polybatch CE | 0.922 |
| 3 | 0.0% | Polybatch | 0.000 | 3 | 2.0% | VERSIFY 2300 | 0.922 | 3 | 0.0% | 505E | 0.000 |
| 4 | 0.0% | CE 505E | 0.000 | 4 | 0.0% | Polybatch | 0.000 | 4 | 0.0% |  | 0.000 |
| Total | 100.0% |  | 0.9053 | Total | 100.0% | CE 505E | 0.8933 | Total | 100.0% |  | 0.9053 |

| Layer E | Amount | Component | g/cm¹ | Layer E | Amount | Component | g/cm¹ | Layer E | Amount | Component | g/cm¹ |
|---|---|---|---|---|---|---|---|---|---|---|---|
| 1 | 98.0% | ATTANE | 0.905 | 1 | 68.0% | ATTANE SL | 0.905 | 1 | 98.0% | 6101 | 0.905 |
| 2 | 2.0% | SL 4102G | 0.922 | 2 | 30.0% | 4102G | 0.866 | 2 | 2.0% | Polybatch CE | 0.922 |
| 3 | 0.0% | Polybatch | 0.000 | 3 | 2.0% | VERSIFY 2300 | 0.922 | 3 | 0.0% | 505E | 0.000 |
| 4 | 0.0% | CE 505E | 0.000 | 4 | 0.0% | Polybatch | 0.000 | 4 | 0.0% |  | 0.000 |
| Total | 100.0% |  | 0.9053 | Total | 100.0% | CE 505E | 0.8933 | Total | 100.0% |  | 0.9053 |

| Layer F | Amount | Component | g/cm¹ | Layer F | Amount | Component | g/cm¹ | Layer F | Amount | Component | g/cm¹ |
|---|---|---|---|---|---|---|---|---|---|---|---|
| 1 | 98.0% | ATTANE | 0.905 | 1 | 68.0% | ATTANE SL | 0.905 | 1 | 98.0% | 6101 | 0.905 |
| 2 | 2.0% | SL 4102G | 0.922 | 2 | 30.0% | 4102G | 0.866 | 2 | 2.0% | Polybatch CE | 0.922 |
| 3 | 0.0% | Polybatch | 0.000 | 3 | 2.0% | VERSIFY 2300 | 0.922 | 3 | 0.0% | 505E | 0.000 |
| 4 | 0.0% | CE 505E | 0.000 | 4 | 0.0% | Polybatch | 0.0000 | 4 | 0.0% |  | 0.000 |
| Total | 100.0% |  | 0.9053 | Total | 100.0% | CE 505E | 0.8933 | Total | 100.0% |  | 0.9053 |

| Layer G | Amount | Component | g/cm¹ | Layer G | Amount | Component | g/cm¹ | Layer G | Amount | Component | g/cm¹ |
|---|---|---|---|---|---|---|---|---|---|---|---|
| 1 | 98.0% | LDPE 770G | 0.918 | 1 | 98.0% | LDPE 770G | 0.918 | 1 | 98.0% | LDPE 770G | 0.918 |
| 2 | 2.0% | Polybatch | 0.982 | 2 | 2.0% | Polybatch FSU | 0.982 | 2 | 2.0% | Polybatch FSU | 0.982 |
| 3 | 0.0% | FSU 1051 | 0.000 | 3 | 0.0% | 1051 | 0.000 | 3 | 0.0% | 1051 | 0.000 |
| 4 | 0.0% |  | 0.000 | 4 | 0.0% |  | 0.000 | 4 | 0.0% |  | 0.000 |
| Total | 100.0% |  | 0.9192 | Total | 100.0% |  | 0.9192 | Total | 100.0% |  | 0.9192 |

| Overall | µm | Thickness | Density g/cm¹ | Overall | µm | Thickness | Density g/cm¹ | Overall | µm | Thickness | Density g/cm¹ |
|---|---|---|---|---|---|---|---|---|---|---|---|
| Layer A | 5 | 10.0% | 0.9192 | Layer A | 5 | 10.0% | 0.9192 | Layer A | 5 | 10.0% | 0.9192 |
| Layer B | 8 | 16.0% | 0.9053 | Layer B | 8 | 16.0% | 0.8933 | Layer B | 8 | 16.0% | 0.9053 |
| Layer C | 8 | 16.0% | 0.9053 | Layer C | 8 | 16.0% | 0.8933 | Layer C | 8 | 16.0% | 0.9053 |
| Layer D | 8 | 16.0% | 0.9053 | Layer D | 8 | 16.0% | 0.8933 | Layer D | 8 | 16.0% | 0.9053 |
| Layer E | 8 | 16.0% | 0.9053 | Layer E | 8 | 16.0% | 0.8933 | Layer E | 8 | 16.0% | 0.9053 |
| Layer F | 8 | 16.0% | 0.9053 | Layer F | 8 | 16.0% | 0.8933 | Layer F | 8 | 16.0% | 0.9053 |
| Layer G | 5 | 10.0% | 0.9192 | Layer G | 5 | 10.0% | 0.9192 | Layer G | 5 | 10.0% | 0.9192 |
| Total | 50 | 100.0% | 0.9081 | Total | 50 | 100.0% | 0.8984 | Total | 50 | 100.0% | 0.9081 |

| Operation Instructions | | | | Operation Instructions | | | | Operation Instructions | | | |
|---|---|---|---|---|---|---|---|---|---|---|---|
| Film Gauge | µm | | 50 | Film Gauge | µm | | 50 | Film Gauge | µm | | 50 |
| Specify BUR/Layflat | | | BUR | Specify BUR/Layflat | | | BUR | Specify BUR/Layflat | | | BUR |
| BUR | | | 2.5 | BUR | | | 2.5 | BUR | | | 2.5 |
| Layflat | mm width | | 235.6 | Layflat | mm width | | 235.6 | Layflat | mm | | 235.6 |
| Corona Treatment | | | No | Corona Treatment | | | No | Corona Treatment | | | No |
| Roll Length | m length | | 250 | Roll Length | m length | | 250 | Roll Length | m length | | 250 |
| Sample wt | kg | | 5.3 | Sample wt | kg | | 5.3 | Sample wt | kg | | 5.3 |

| Special Instructions | Special Instructions | Special Instructions |
|---|---|---|
| Cut film to 180 mm width −200 m for customer −50 m for us | Cut film to 180 mm width −200 m for customer −50 m for us | Cut film to 180 mm width −200 m for customer −50 m for us |
| Comparative C Affinity PF 1140G (0.8965; 1.6) core layer | Comparative D Infuse OBC (0.877; 0.50) core layer | Comparative E Reference Structure PEV; blend of Greenflex FF 35 and Riblene FF 34 |

| Design Total Gauge Layer A | 50 Amount | µm Component | Density g/cm¹ | Design Total Gauge Layer A | 50 Amount | µm Component | Density g/cm¹ | Design Total Gauge Layer A | 50 Amount | µm Component | Density g/cm¹ |
|---|---|---|---|---|---|---|---|---|---|---|---|
| 1 | 98.0% | LDPE 770G | 0.918 | 1 | 98.0% | Infuse OBC | 0.918 | 1 | 73.0% | Greenflex FF 35 | 0.929 |
| 2 | 2.0% | Polybatch | 0.982 | 2 | 2.0% | Polybatch | 0.982 | 2 | 25.0% | Riblene FF 34 | 0.924 |

TABLE 3-continued

|   | Amount | Component | g/cm³ |   | Amount | Component | g/cm³ |   | Amount | Component | g/cm³ |
|---|---|---|---|---|---|---|---|---|---|---|---|
| 3 | 0.0% | FSU 1051 | 0.000 | 3 | 0.0% | FSU 1051 | 0.000 | 3 | 2.0% | Polybatch FSU 1051 | 0.982 |
| 4 | 0.0% |  | 0.000 | 4 | 0.0% |  | 0.000 | 4 | 0.0% |  | 0.000 |
| Total | 100.0% |  | 0.9192 | Total | 100.0% |  | 0.9192 | Total | 100.0% |  | 0.9287 |

| Layer B | Amount | Component | g/cm³ | Layer B | Amount | Component | g/cm³ | Layer B | Amount | Component | g/cm³ |
|---|---|---|---|---|---|---|---|---|---|---|---|
| 1 | 98.0% | AFFINITY | 0.897 | 1 | 98.0% | Infuse OBC | 0.877 | 1 | 98.0% | Greenflex FF 35 | 0.929 |
| 2 | 2.0% | PF 11400 | 0.922 | 2 | 2.0% | Polybatch | 0.922 | 2 | 2.0% | Polybatch | 0.922 |
| 3 | 0.0% | Polybatch | 0.000 | 3 | 0.0% | CE 505E | 0.000 | 3 | 0.0% | CE 505E | 0.000 |
| 4 | 0.0% | CE 505E | 0.000 | 4 | 0.0% |  | 0.000 | 4 | 0.0% |  | 0.000 |
| Total | 100.0% |  | 0.8975 | Total | 100.0% |  | 0.8779 | Total | 100.0% |  | 0.9289 |

| Layer C | Amount | Component | g/cm³ | Layer C | Amount | Component | g/cm³ | Layer C | Amount | Component | g/cm³ |
|---|---|---|---|---|---|---|---|---|---|---|---|
| 1 | 98.0% | AFFINITY | 0.897 | 1 | 98.0% | Infuse OBC | 0.877 | 1 | 98.0% | Greenflex FF 35 | 0.929 |
| 2 | 2.0% | PF 11400 | 0.922 | 2 | 2.0% | Polybatch | 0.922 | 2 | 2.0% | Polybatch | 0.922 |
| 3 | 0.0% | Polybatch | 0.000 | 3 | 0.0% | CE 505E | 0.000 | 3 | 0.0% | CE 505E | 0.000 |
| 4 | 0.0% | CE 505E | 0.000 | 4 | 0.0% |  | 0.000 | 4 | 0.0% |  | 0.000 |
| Total | 100.0% |  | 0.8975 | Total | 100.0% |  | 0.8779 | Total | 100.0% |  | 0.9289 |

| Layer D | Amount | Component | g/cm³ | Layer D | Amount | Component | g/cm³ | Layer D | Amount | Component | g/cm³ |
|---|---|---|---|---|---|---|---|---|---|---|---|
| 1 | 98.0% | AFFINITY | 0.897 | 1 | 98.0% | Infuse OBC | 0.877 | 1 | 98.0% | Greenflex FF 35 | 0.929 |
| 2 | 2.0% | PF 11400 | 0.922 | 2 | 2.0% | Polybatch | 0.922 | 2 | 2.0% | Polybatch | 0.922 |
| 3 | 0.0% | Polybatch | 0.000 | 3 | 0.0% | CE 505E | 0.000 | 3 | 0.0% | CE 505E | 0.000 |
| 4 | 0.0% | CE 505E | 0.000 | 4 | 0.0% |  | 0.000 | 4 | 0.0% |  | 0.000 |
| Total | 100.0% |  | 0.8975 | Total | 100.0% |  | 0.8779 | Total | 100.0% |  | 0.9289 |

| Layer E | Amount | Component | g/cm³ | Layer E | Amount | Component | g/cm³ | Layer E | Amount | Component | g/cm³ |
|---|---|---|---|---|---|---|---|---|---|---|---|
| 1 | 98.0% | AFFINITY | 0.897 | 1 | 98.0% | Infuse OBC | 0.877 | 1 | 98.0% | Greenflex FF 35 | 0.929 |
| 2 | 2.0% | PF 11400 | 0.922 | 2 | 2.0% | Polybatch | 0.922 | 2 | 2.0% | Polybatch | 0.922 |
| 3 | 0.0% | Polybatch | 0.000 | 3 | 0.0% | CE 505E | 0.000 | 3 | 0.0% | CE 505E | 0.000 |
| 4 | 0.0% | CE 505E | 0.000 | 4 | 0.0% |  | 0.000 | 4 | 0.0% |  | 0.000 |
| Total | 100.0% |  | 0.8975 | Total | 100.0% |  | 0.8779 | Total | 100.0% |  | 0.9269 |

| Layer F | Amount | Component | g/cm³ | Layer F | Amount | Component | g/cm³ | Layer F | Amount | Component | g/cm³ |
|---|---|---|---|---|---|---|---|---|---|---|---|
| 1 | 98.0% | AFFINITY | 0.897 | 1 | 98.0% | Infuse OBC | 0.877 | 1 | 98.0% | Greenflex FF 35 | 0.929 |
| 2 | 2.0% | PF 11400 | 0.922 | 2 | 2.0% | Polybatch | 0.922 | 2 | 2.0% | Polybatch | 0.922 |
| 3 | 0.0% | Polybatch | 0.000 | 3 | 0.0% | CE 505E | 0.000 | 3 | 0.0% | CE 505E | 0.000 |
| 4 | 0.0% | CE 505E | 0.000 | 4 | 0.0% |  | 0.000 | 4 | 0.0% |  | 0.000 |
| Total | 100.0% |  | 0.8975 | Total | 100.0% |  | 0.8779 | Total | 100.0% |  | 0.9289 |

| Laye G | Amount | Component | g/cm³ | Layer G | Amount | Component | g/cm³ | Layer G | Amount | Component | g/cm³ |
|---|---|---|---|---|---|---|---|---|---|---|---|
| 1 | 98.0% | LDPE 770G | 0.918 | 1 | 98.0% | LDPE 770G | 0.918 | 1 | 73.0% | Greenflex FF 35 | 0.929 |
| 2 | 2.0% | Polybatch | 0.982 | 2 | 2.0% | Polybatch | 0.982 | 2 | 25.0% | Riblene FF 34 | 0.924 |
| 3 | 0.0% | FSU 1051 | 0.000 | 3 | 0.0% | FSU 1051 | 0.000 | 3 | 2.0% | Polybatch FSU 1051 | 0.982 |
| 4 | 0.0% |  | 0.000 | 4 | 0.0% |  | 0.000 | 4 | 0.0% |  | 0.000 |
| Total | 100.0% |  | 0.9192 | Total | 100.0% |  | 0.9192 | Total | 100.0% |  | 0.9287 |

| Overall | μm | Thickness | Density g/cm³ | Overall | μm | Thickness | Density g/cm³ | Overall | μm | Thickness | Density g/cm³ |
|---|---|---|---|---|---|---|---|---|---|---|---|
| Layer A | 5 | 10.0% | 0.9192 | Layer A | 5 | 10.0% | 0.9192 | Layer A | 5 | 10.0% | 0.9287 |
| Layer B | 8 | 16.0% | 0.8975 | Layer B | 8 | 16.0% | 0.8779 | Layer B | 8 | 16.0% | 0.9289 |
| Layer C | 8 | 16.0% | 0.8975 | Layer C | 8 | 16.0% | 0.8779 | Layer C | 8 | 16.0% | 0.9289 |
| Layer D | 8 | 16.0% | 0.8975 | Layer D | 8 | 16.0% | 0.8779 | Layer D | 8 | 16.0% | 0.9289 |
| Layer E | 8 | 16.0% | 0.8975 | Layer E | 8 | 16.0% | 0.8779 | Layer E | 8 | 16.0% | 0.9289 |
| Layer F | 8 | 16.0% | 0.8975 | Layer F | 8 | 16.0% | 0.8779 | Layer F | 8 | 16.0% | 0.9289 |
| Layer G | 5 | 10.0% | 0.9192 | Layer G | 5 | 10.0% | 0.9192 | Layer G | 5 | 10.0% | 0.9287 |
| Total | 50 | 100.0% | 0.9018 | Total | 50 | 100.0% | 0.8861 | Total | 50 | 100.0% | 0.9288 |

TABLE 3-continued

| Operation Instructions | | | Operation Instructions | | | Operation Instructions | | |
|---|---|---|---|---|---|---|---|---|
| Film Gauge | μm | 50 | Film Gauge | μm | 50 | Film Gauge | μm | 50 |
| Specify BUR/Layflat | | BUR | Specify BUR/Layflat | | BUR | Specify BUR/Layflat | | BUR |
| BUR | | 2.5 | BUR | | 2.5 | BUR | | 2.5 |
| Layflat | mm width | 235.6 | Layflat | mm width | 235.6 | Layflat | mm | 235.6 |
| Corona Treatment | | No | Corona Treatment | | No | Corona Treatment | | No |
| Roll Length | m length | 250 | Roll Length | m length | 250 | Roll Length | m length | 250 |
| Sample wt | kg | 5.3 | Sample wt | kg | 5.3 | Sample wt | kg | 5.3 |

| Special Instructions | Special Instructions | Special Instructions |
|---|---|---|
| Cut film to 180 mm width –200 m for customer –50 m for us | Cut film to 180 mm width –200 m for customer –50 m for us | Cut film to 180 mm width –200 m for customer –50 m for us |

Properties for the stretch-sleeve films of Table 3 are provided in Table 4 below.

TABLE 4

| SAMPLE CODE | | | Comp A | Comp B | Inventive Example | Comp C | Comp D | Comp E |
|---|---|---|---|---|---|---|---|---|
| Core layer | | | Attane SL 4102G | Attane SL 4102G + 30% Versify 2300 | 6101 | Affinity PF 1140G | OBC | EVA (9% VA) |
| Film Thickness in μm | | | 50 | 50 | 50 | 50 | 50 | 50 |
| ELASTIC RECOVERY 55% Machine: Lloyd LR 5K | | | Norm: Specimen: 15 × 150 mm | | | Test Speed: 500 mm/min. Gauge: 100 mm | | |
| Max. Force | N/15 mm | CD | 5.17 | 4.39 | 5.46 | 4.71 | 2.87 | 4.79 |
| Permanent Deformation | % | CD | 6.63 | 5.21 | 4.91 | 4.75 | 5.62 | 4.82 |
| Elastic Recovery | % | CD | 93.4 | 94.8 | 95.1 | 95.2 | 94.4 | 95.2 |
| ELASTIC RECOVERY 55% Machine: Lloyd LR 5K | | | Conditions as above but final specimen length measured by hand. | | | | | |
| Final Distance between marks. | N/15 mm | CD | 104.2 | 102.8 | 102.4 | 102 | 103.8 | 101.9 |
| Permanent Deformation | % | CD | 4.20 | 2.80 | 2.40 | 2.00 | 3.80 | 1.90 |
| Elastic Recovery | % | CD | 95.8 | 97.2 | 97.6 | 98 | 96.2 | 98.1 |
| ELASTIC RECOVERY 60% Machine: Lloyd LR 5K | | | Norm: Specimen: 15 × 150 mm | | | Test Speed: 500 mm/min. Gauge: 100 mm | | |
| Max. Force | N/15 mm | CD | 5.14 | 4.46 | 5.49 | 4.79 | 2.84 | 4.82 |
| Permanent Deformation | % | CD | 6.96 | 5.64 | 5.65 | 5.32 | 5.95 | 5.45 |
| Elastic Recovery | % | CD | 93.04 | 94.35 | 94.34 | 94.68 | 94.05 | 94.54 |
| ELASTIC RECOVERY 60% Machine: Lloyd LR 5K | | | Conditions as above but final specimen length measured by hand. | | | | | |
| Final Distance between marks. | N/15 mm | CD | 104.2 | 103 | 103 | 102 | 103.6 | 102.3 |
| Permanent Deformation | % | CD | 4.20 | 3.00 | 3.00 | 2.00 | 3.60 | 2.30 |
| Elastic Recovery | % | CD | 95.8 | 97 | 97 | 98 | 96.4 | 97.7 |
| Remarks: | | | Speed to reach 55 or 60% Elongation and back to Zero Point = 500 mm/min. Waiting Time at Zero Point = 6 seconds. Speed to get a Force of 0.1 N/15 mm = 100 mm/min. | | | | | |
| ELASTIC RECOVERY 55% Machine: Lloyd LR 5K | | | Norm: Recovery per ASTM D5459 Specimen: 25 × 150 mm | | | Test Speed: 500 mm/min. Gauge: 100 mm | | |
| A = Max. Force | N/25 mm | CD | | | | | 7.68 | 7.91 |
| B = Force after 3 seconds | N/25 mm | CD | | | | | 6.84 | 6.99 |
| D = Elongation at 0.1N Force | % | CD | | | | | 5.23 | 5.28 |
| Stress Relaxation | % | CD | | | | | 10.97 | 11.66 |
| Stress Retention | % | CD | | | | | 89.03 | 88.34 |
| Permanent Deformation | % | CD | | | | | 9.51 | 9.60 |
| Elastic Recovery | % | CD | | | | | 90.49 | 90.40 |

TABLE 4-continued

| SAMPLE CODE | | | Comp A | Comp B | Inventive Example | Comp C | Comp D | Comp E |
|---|---|---|---|---|---|---|---|---|
| Remarks: | | | \multicolumn{6}{c}{Speed to reach 55% Elongation = 500 mm/min. 1. waiting Time at 55% Elongation = 3 seconds. Speed to get back to Zero Point = 500 mm/min. 2. waiting Time at 0% Elongation = 6 seconds. Speed to get a Force of 0.1 N/15 mm = 100 mm/min.} | | | | | |
| COEFFICIENT OF DYN. FRICTION Machine: Lloyd LR 5K | | | Norm: ISO 8295 Specimen: 8 × 8 cm | | Test Speed: 100 mm/min. Sledge Weight: 200 g. | | | |
| Inside/Inside (Film/Film) | | | 0.07 | 0.08 | 0.07 | 0.06 | 0.08 | 0.09 |
| MODULUS Machine: Zwick Z010 | | | Norm: ISO 527-3 Specimen: TYPE 2 | | Test Speed: 5 mm/min. Grip Distance: 100 mm | | Grips: Convex | |
| Thickness | μm | MD | 47.8 | 52.8 | 52.5 | 54.7 | 51.1 | 48.4 |
| | | CD | 48.4 | 52.7 | 49.8 | 53.8 | 49.1 | 49.1 |
| Modulus of Elasticity | MPa | MD | 109 | 82.9 | 99.1 | 72.5 | 48.6 | 82.6 |
| | | CD | 130 | 92.3 | 111 | 76.4 | 58.5 | 100 |
| 1% Secant Modulus | MPa | MD | 99.9 | 80.5 | 96.1 | 69.7 | 49.1 | 91.3 |
| | | CD | 110 | 81.3 | 102 | 70.0 | 51.4 | 95.9 |
| 2% Secant Modulus | MPa | MD | 89.1 | 75.1 | 87.4 | 65.2 | 44.7 | 85.1 |
| | | CD | 95.2 | 71.8 | 91.5 | 62.4 | 45.3 | 86.5 |
| TENSILE PROPERTIES Machine: Zwick Z010 | | | Norm: ISO 527-3 Specimen: TYPE 2 | | Test Speed: 5 mm/min. Grip Distance: 100 mm | | Grips: Convex | |
| Tensile Strength at 5% Elongation | MPa | MD | 5.5 | 4.24 | 4.6 | 3.64 | 2.74 | 4.39 |
| | | CD | 5.47 | 4.18 | 4.56 | 3.37 | 2.65 | 4.45 |
| Tensile Strength at 10% Elongation | MPa | MD | 7.15 | 5.59 | 6.11 | 5.01 | 3.56 | 6.1 |
| | | CD | 6.58 | 5.12 | 5.8 | 4.49 | 3.26 | 5.74 |
| Tensile Strength at 25% Elongation | MPa | MD | 8.28 | 6.79 | 7.06 | 6.2 | 4.41 | 7.84 |
| | | CD | 6.89 | 5.56 | 6.33 | 5.1 | 3.54 | 6.13 |
| Tensile Strength at 50% Elongation | MPa | MD | 9.62 | 8.21 | 8.49 | 7.56 | 5.21 | 11.45 |
| | | CD | 7.33 | 5.99 | 7.29 | 5.84 | 3.76 | 6.74 |
| Yield Stress | MPa | MD | 10.21 | 8.87 | 9.45 | 8.07 | 5.63 | no value |
| | | CD | 6.79 | 6.04 | 7.67 | 6.22 | 3.62 | 6.27 |
| Yield Strain | % | MD | 81.4 | 83.2 | 92.8 | 67.3 | 76.4 | no value |
| | | CD | 16.9 | 55.2 | 70.6 | 80.5 | 32.6 | 29.8 |
| Tensile Strength (max) | MPa | MD | 33.7 | 26.7 | 30.3 | 34.0 | 25.5 | 23.3 |
| | | CD | 32.8 | 31.8 | 36.2 | 29.0 | 28.6 | 21.5 |
| Tensile Strain at Tensile Strength | % | MD | 611 | 556 | 515 | 636 | 569 | 277 |
| | | CD | 687 | 691 | 591 | 680 | 689 | 541 |
| Tensile Stress at Break | MPa | MD | 33.7 | 26.6 | 29.5 | 33.7 | 25.1 | 23.2 |
| | | CD | 32.6 | 24.3 | 36.0 | 28.5 | 28.5 | 21.5 |
| Tensile Strain at Break | % | MD | 611 | 556 | 517 | 637 | 569 | 278 |
| | | CD | 688 | 691 | 591 | 680 | 690 | 541 |
| Toughness | MJ/m$^3$ | MD | 94.9 | 74.7 | 72.0 | 94.2 | 56.5 | 44.7 |
| | | CD | 88.3 | 81.1 | 79.5 | 75.4 | 56.8 | 57.4 |

2. Results Summary for Additional Examples

Applicant discovered that the present stretch-sleeve film with ELITE™ AT 6101 in at least the core layer of a suitable blown film structure provides an unexpected property balance between elastic recovery and holding force. The present stretch-sleeve film is suitable for applications such as stretch sleeve labels for highly contoured bottles and highly contoured containers, where changes in sleeve diameter exceeds 50%.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A stretch-sleeve film comprising:
   a. at least three layers comprising two skin layers and a core layer;
   b. the core layer comprising at least 75 wt % of an ethylene/1-octene copolymer (A) characterized by
      i. a density from 0.890 g/cc to 0.910 g/cc;
      ii. a Mw/Mn from 2.0 to 4.0;
      iii. a ZSVR less than 6.0;
      iv. a CDC from 85 to 150;
      v. a vinyl unsaturation of less than 0.15 vinyls per 1000 carbon atoms; and
   c. at least one of the skin layers comprises a polymeric material selected from the group consisting of the ethylene/1-octene copolymer (A), a low density polyethylene, a medium density polyethylene, and combinations thereof.

2. The stretch-sleeve film of claim 1 wherein the core layer comprises from 75 wt % to 100 wt % of the ethylene/1-octene copolymer (A) and from 25 wt % to 0 wt % of a polymeric material selected from the group consisting of a low density polyethylene, a medium density polyethylene, and combinations thereof.

3. The stretch-sleeve film of claim 1 wherein the core layer comprises from 75 wt % to 99 wt % of the ethylene/1-octene copolymer (A) and from 25 wt % to 1 wt % of a low density polyethylene.

4. The stretch-sleeve film of claim 1 wherein each skin layer is composed of the same polymeric material, the polymeric material selected from the group consisting of the ethylene/1-octene copolymer (A), a low density polyethylene, a medium density polyethylene, and combinations thereof.

5. The stretch-sleeve film of claim 1 wherein the stretch-sleeve film is a coextruded blown film.

6. The stretch-sleeve film of claim 1 comprising at least one inner layer located between the core layer and a skin layer, the inner layer comprising a polymeric material selected from the group consisting of the ethylene/1-octene copolymer (A), a low density polyethylene, a medium density polyethylene, and combinations thereof.

7. The stretch-sleeve film of claim 1 wherein the stretch-sleeve film comprises at least two inner layers, wherein each inner layer is located between the core layer and one of the skin layers.

8. The stretch-sleeve film of claim 1 having a thickness from 25 microns to 75 microns.

9. The stretch-sleeve film of claim 1 having an elastic recovery at 55% stretch of at least 95%.

10. The stretch-sleeve film of claim 1 having a tensile strength greater than 30 MPa.

11. The stretch-sleeve film of claim 1 having a modulus of elasticity of at least 95 MPa.

12. An article comprising:
a container; and
the stretch-sleeve film of claim 1, the stretch-sleeve film surrounding an outer surface of the container.

13. The article of claim 12 wherein the film is compressively engaged to the outer surface with a holding force expressed as tensile strength from 4 MPa to 10 MPa.

14. The article of claim 12 wherein the stretch-sleeve film comprises at least one of printing and a colorant.

* * * * *